US008712881B1

(12) United States Patent
Phillips et al.

(10) Patent No.: US 8,712,881 B1
(45) Date of Patent: *Apr. 29, 2014

(54) METHOD, SYSTEM AND COMPUTER PROGRAM PRODUCT FOR MANAGING FUNDS IN CUSTODIAL DEPOSIT ACCOUNTS

(75) Inventors: Douglas E. Phillips, Arlington, VA (US); Robert N. Hyland, Arlington, VA (US); Anthony R. Carlino, Arlington, VA (US)

(73) Assignee: Promontory Interfinancial Network, LLC, Arlington, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/560,544

(22) Filed: Jul. 27, 2012

Related U.S. Application Data

(62) Division of application No. 12/419,691, filed on Apr. 7, 2009, now Pat. No. 8,234,188.

(51) Int. Cl.
*G07B 17/00* (2006.01)
*G06Q 40/00* (2012.01)

(52) U.S. Cl.
USPC .............................................. 705/30; 705/35

(58) Field of Classification Search
USPC ................................................................ 705/30
See application file for complete search history.

(56) References Cited

U.S. PATENT DOCUMENTS

| 4,774,663 | A | 9/1988 | Musmanno et al. |
| 4,985,833 | A | 1/1991 | Oncken |
| 5,893,078 | A | 4/1999 | Paulson |
| 6,026,381 | A | 2/2000 | Barton, III et al. |
| 6,374,231 | B1 | 4/2002 | Bent et al. |
| 7,302,413 | B1 | 11/2007 | Bent et al. |
| 7,376,606 | B2 | 5/2008 | Jacobsen |
| 7,398,245 | B1 | 7/2008 | Bent et al. |
| 7,440,914 | B2 | 10/2008 | Jacobsen |
| 7,509,286 | B1 | 3/2009 | Bent et al. |
| 7,519,551 | B2 | 4/2009 | Bent et al. |
| 7,536,350 | B1 | 5/2009 | Bent et al. |
| 7,574,403 | B2 | 8/2009 | Webb et al. |

(Continued)

OTHER PUBLICATIONS

"First Horizon Bank Health Savings Account Sweep Agreement and Investment Instructions," http://www.firsthorizonmsaver.com/files/mutual_fund_app.pdf; accessed Sep. 17, 2010 (6 pages).

(Continued)

*Primary Examiner* — Garcia Ade
(74) *Attorney, Agent, or Firm* — Sterne, Kessler, Goldstein & Fox PLLC

(57) ABSTRACT

A method, system and computer program product for managing aggregate funds held in a custodial deposit accounts by a custodial agent on behalf of a plurality of individuals. According to the present invention, the custodial deposit accounts comprises an omnibus transaction account ("Omnibus TA") and a Omnibus money market deposit account ("Omnibus MMDA"). A corresponding individual transaction account ("Individual TA") and individual money market deposit account ("Individual MMDA") are kept on the books and records of the custodial agent for each individual, representing the amount of the individual's funds deposited in the Omnibus TA and Omnibus MMDA, respectively. According to the present invention, limitations on transfers from the Omnibus MMDA to the Omnibus TA and limitations on transfers from the corresponding Individual MMDAs to the Individual TAs are managed by daily allocation of the funds in the Individual TAs and Individual MMDAs.

20 Claims, 13 Drawing Sheets

(56) References Cited

U.S. PATENT DOCUMENTS

| | | |
|---|---|---|
| 7,596,522 B1 | 9/2009 | Jacobsen |
| 7,603,307 B2 | 10/2009 | Jacobsen |
| 7,640,199 B1 | 12/2009 | Hyland |
| 7,668,771 B1 | 2/2010 | Bent et al. |
| 7,668,772 B1 | 2/2010 | Bent et al. |
| 7,672,886 B2 | 3/2010 | Bent et al. |
| 7,672,901 B1 | 3/2010 | Bent et al. |
| 7,672,902 B1 | 3/2010 | Bent et al. |
| 7,680,716 B1 | 3/2010 | Bent et al. |
| 7,680,734 B1 | 3/2010 | Bent et al. |
| 7,716,131 B2 | 5/2010 | Bent et al. |
| 7,752,107 B1 | 7/2010 | Bent et al. |
| 7,752,129 B2 | 7/2010 | Bent et al. |
| 7,769,688 B1 | 8/2010 | Bent et al. |
| 7,809,640 B1 | 10/2010 | Bent et al. |
| 7,835,976 B2 * | 11/2010 | Hagerman et al. ............... 705/37 |
| 7,933,821 B1 | 4/2011 | Bent et al. |
| 7,996,308 B1 | 8/2011 | Bent et al. |
| 8,019,667 B1 | 9/2011 | Bent et al. |
| 8,019,668 B1 * | 9/2011 | Bent et al. ........................ 705/35 |
| 8,032,456 B1 | 10/2011 | Bent et al. |
| RE43,246 E | 3/2012 | Bent et al. |
| 8,190,520 B1 | 5/2012 | Hyland |
| 2002/0087454 A1 | 7/2002 | Calo et al. |
| 2003/0135437 A1 | 7/2003 | Jacobsen |
| 2005/0044038 A1 | 2/2005 | Whiting et al. |
| 2005/0154662 A1 | 7/2005 | Langenwalter |
| 2006/0047593 A1 | 3/2006 | Naratil et al. |
| 2006/0212378 A1 | 9/2006 | Hoffman et al. |
| 2006/0224480 A1 | 10/2006 | Bent et al. |
| 2007/0005493 A1 | 1/2007 | Kandravy et al. |
| 2007/0043666 A1 | 2/2007 | Burdette |
| 2007/0276752 A1 | 11/2007 | Whiting et al. |
| 2007/0294158 A1 | 12/2007 | Patel et al. |
| 2008/0052215 A1 | 2/2008 | Tudisco |
| 2008/0288398 A1 | 11/2008 | Maricondi |
| 2009/0048954 A1 | 2/2009 | Blackburn et al. |
| 2009/0106161 A1 | 4/2009 | Alemany |

OTHER PUBLICATIONS

King, Amanda Swift, "Untangling the effects of credit cards on money demand: convenience usage vs. borrowing," *Quart. J. Bus. Econ.* 43(1/2):57-80, University of Nebraska-Lincoln, United States (2004) (33 pages).

Nair, S. K., et al., "A Specialized Inventory Problem in Banks: Optimizing Retail Sweeps," *Prod. Oper. Manag. 17*(3): 285-295, Wiley-Blackwell, United States (2008) (16 pages).

O'Brien, Christine D., et al., "International liquidity management: Solutions for the 21st century," *TMA Journal 15*(2):28-35 (1995) (7 pages).

Lloyds TSB Group PLC, Regulatory News Service, Feb. 11, 2000. WRNS, Part 2, pp. 7-42, 8 pages.

Martin, Stephanie. Memo from Legal Division of Board of Governors of the Federal Reserve System, Washington, DC, Apr. 22, 2004 (8 pgs.).

Bradley, C. et al., "The Liability Structure of FDIC-Insured Institutions: Changes and Implications." *FDIC Banking Review*, vol. 18, No. 2: 1-37, 2006 (37 pgs.).

*DeBlasio et al. v. Merrill Lynch & Co.*, No. 07-cv-318 (RJS), electronic case filing, Feb. 5, 2008 (49 pgs.).

FDIC Law, Regulations, Related Acts. Part 204—Reserve Requirements of Depository Institutions (Regulation D). www.fdic.gov/regulations/laws/rules/7500-500.html, accessed Jun. 14, 2012 (25 pgs.).

"Finistar documents" in the Jun. 27, 2012, final Office Action in related U.S. Appl. No. 13/245,538 (no date available) (16 pgs.).

U.S. Appl. No. 13/149,263, entitled "Auditing and Reconciling Sub-custodial Accounts in an Insured Bank to Bank Sweep Program," inventors Phillips et al., filed May 31, 2011 [Not Published].

U.S. Appl. No. 13/245,538, entitled "Method, System, and Computer Program Product for Managing Funds in Custodial Deposit Accounts," inventors Phillips et al., filed Sep. 26, 2011 [Not Published].

\* cited by examiner

Fig. 6A

Individual Level

| Day | | Andrew | | | | Betty | | | | Carl | | |
|---|---|---|---|---|---|---|---|---|---|---|---|---|
| | | TA | MMDA | Total | Counter | TA | MMDA | Total | Counter | TA | MMDA | Total | Counter |
| 1 | Opening | $5.00 | $95.00 | $100.00 | 0 | $5.00 | $95.00 | $100.00 | 0 | $5.00 | $95.00 | $100.00 | 0 |
| | Activity: Andrew writes a check for $10; Betty deposits a check for $5. | | | | | | | | | | | | |
| 1a | | $10.00 | $90.00 | $100.00 | 1 | $10.00 | $95.00 | $105.00 | 0 | $5.00 | $95.00 | $100.00 | 0 |
| 1b | | $0.00 | $90.00 | $90.00 | 1 | $10.00 | $95.00 | $105.00 | 0 | $5.00 | $95.00 | $100.00 | 0 |
| 1c | Settlement | $0.00 | $90.00 | $90.00 | 1 | $5.00 | $100.00 | $105.00 | 0 | $5.00 | $95.00 | $100.00 | 0 |

Custodial Level

| Day | TA | MMDA | Total | Counter | Net Balance Change | | | |
|---|---|---|---|---|---|---|---|---|
| | | | | | TA | MMDA | Total | Cushion | TTP |
| 1 | $15.00 | $285.00 | $300.00 | 0 | | | | 5.00% | 5.00% |
| 1a | $25.00 | $280.00 | $305.00 | 0 | $10.00 | -$5.00 | $5.00 | 8.20% | 5.00% |
| 1b | $15.00 | $280.00 | $295.00 | 0 | $0.00 | -$5.00 | -$5.00 | 5.08% | 5.00% |
| 1c | $10.00 | $285.00 | $295.00 | 0 | -$5.00 | $0.00 | -$5.00 | 3.39% | 5.00% |

Fig. 6B

Individual Level

| Day | | Andrew | | | | Betty | | | | Carl | | |
|---|---|---|---|---|---|---|---|---|---|---|---|---|
| | | TA | MMDA | Total | Counts | TA | MMDA | Total | Counts | TA | MMDA | Total | Counts |
| 2 | Opening | $0.00 | $90.00 | $90.00 | 1 | $5.00 | $100.00 | $105.00 | 0 | $5.00 | $95.00 | $100.00 | 0 |
| 2a | Activity: Andrew writes another check for $5. | | | | | | | | | | | | |
| 2b | | $5.00 | $85.00 | $90.00 | 2 | $5.00 | $100.00 | $105.00 | 0 | $5.00 | $95.00 | $100.00 | 0 |
| | | $0.00 | $85.00 | $85.00 | 2 | $5.00 | $100.00 | $105.00 | 0 | $5.00 | $95.00 | $100.00 | 0 |
| 2c | Settlement $0.00 | $85.00 | $85.00 | 2 | $0.00 | $105.00 | $105.00 | 0 | $5.00 | $95.00 | $100.00 | 0 |

Custodial Level

| Day | | TA | MMDA | Total | Counter | | Net Balance Change | | | |
|---|---|---|---|---|---|---|---|---|---|---|
| | | | | | | | TA | MMDA | Total | Cushion | TTP |
| 2 | | $10.00 | $285.00 | $295.00 | 0 | | | | | 3.39% | 5.00% |
| 2a | | $15.00 | $280.00 | $295.00 | 0 | | $5.00 | -$5.00 | $0.00 | 5.08% | 5.00% |
| 2b | | $10.00 | $280.00 | $290.00 | 0 | | $0.00 | -$5.00 | -$5.00 | 3.45% | 5.00% |
| 2c | | $5.00 | $285.00 | $290.00 | 0 | | -$5.00 | $0.00 | -$5.00 | 1.72% | 5.00% |

Fig. 6C

| Individual Level | | | | | | | | | | | | |
|---|---|---|---|---|---|---|---|---|---|---|---|---|
| | Andrew | | | | Betty | | | | Carl | | | |
| Day | | TA | MMDA | Total | Counter | TA | MMDA | Total | Counter | TA | MMDA | Total | Counter |
| 3 | Opening | $0.00 | $85.00 | $85.00 | 2 | $0.00 | $105.00 | $105.00 | 0 | $5.00 | $95.00 | $100.00 | 0 |
| 3a | Activity: Betty deposits $20. | $0.00 | $85.00 | $85.00 | 2 | $20.00 | $105.00 | $125.00 | 0 | $5.00 | $95.00 | $100.00 | 0 |
| 3b | Settlement | $0.00 | $85.00 | $85.00 | 2 | $10.50 | $114.50 | $125.00 | 0 | $5.00 | $95.00 | $100.00 | 0 |

| Custodial Level | | | | | | |
|---|---|---|---|---|---|---|
| | Net Balance Change | | | | | |
| Day | TA | MMDA | Total | Counter | Cushion | TTP |
| 3 | $5.00 | $285.00 | $290.00 | 0 | 1.72% | 5.00% |
| 3a | $25.00 | $285.00 | $310.00 | 0 | 8.06% | 5.00% |
| 3b | $15.50 | $294.50 | $310.00 | 0 | 5.00% | 5.00% |

(Net Balance Change row: TA $20.00, MMDA $0.00, Total $20.00 at 3a; TA $10.50, MMDA $9.50, Total $20.00 at 3b)

Fig. 6D

Individual Level

| Day | | Andrew | | | | Betty | | | | Carl | | |
|---|---|---|---|---|---|---|---|---|---|---|---|---|
| | | TA | MMDA | Total | Counter | TA | MMDA | Total | Counter | TA | MMDA | Total | Counter |
| 4 | Opening | $0.00 | $85.00 | $85.00 | 2 | $10.50 | $114.50 | $125.00 | 0 | $5.00 | $95.00 | $100.00 | 0 |
| 4a | Activity: Carl writes a check for $20. | | | | | | | | | | | | |
| 4b | | $0.00 | $85.00 | $85.00 | 2 | $10.50 | $114.50 | $125.00 | 0 | $20.00 | $80.00 | $100.00 | 1 |
| | | $0.00 | $85.00 | $85.00 | 2 | $10.50 | $114.50 | $125.00 | 0 | $0.00 | $80.00 | $80.00 | 1 |
| 4c | Settlement | $0.00 | $85.00 | $85.00 | 2 | $10.50 | $114.50 | $125.00 | 0 | $24.30 | $55.70 | $80.00 | 1 |

Custodial Level

| Day | | TA | MMDA | Total | Counter | Net Balance Change | | | TTP |
|---|---|---|---|---|---|---|---|---|---|
| | | | | | | TA | MMDA | Total | Cushion |
| 4 | | $15.50 | $294.50 | $310.00 | 0 | | | | 5.00% / 5.00% |
| 4a | | $30.50 | $279.50 | $310.00 | 0 | $15.00 | -$15.00 | $0.00 | 9.84% / 5.00% |
| 4b | | $10.50 | $279.50 | $290.00 | 0 | -$5.00 | -$15.00 | -$20.00 | 3.62% / 5.00% |
| 4c | | $34.80 | $255.20 | $290.00 | 1 | $19.30 | -$39.30 | -$20.00 | 12.00% / 12.00% |

Fig. 6E

Individual Level

| Day | | Andrew | | | | Betty | | | | Carl | | | |
|---|---|---|---|---|---|---|---|---|---|---|---|---|---|
| | | TA | MMDA | Total | Counter | TA | MMDA | Total | Counter | TA | MMDA | Total | Counter |
| 5 | Opening | $0.00 | $85.00 | $85.00 | 2 | $10.50 | $114.50 | $125.00 | 0 | | | | |
| | Activity: Andrew writes a check for $10. | | | | | | | | | | | | |
| 5a | | $10.00 | $75.00 | $85.00 | 3 | $10.50 | $114.50 | $125.00 | 0 | $24.30 | $55.70 | $80.00 | 1 |
| 5b | | $0.00 | $75.00 | $75.00 | 3 | $10.50 | $114.50 | $125.00 | 0 | $24.30 | $55.70 | $80.00 | 1 |
| 5c | Settlement | $0.00 | $75.00 | $75.00 | 3 | $10.50 | $114.50 | $125.00 | 0 | $14.30 | $65.70 | $80.00 | 1 |

Custodial Level

| Day | | TA | MMDA | Total | Counter | Net Balance Change | | | TTP |
|---|---|---|---|---|---|---|---|---|---|
| | | | | | | TA | MMDA | Total | Cushion |
| 5 | | $34.80 | $255.20 | $290.00 | 1 | | | | 12.00% | 12.00% |
| 5a | | $44.80 | $245.20 | $290.00 | 1 | $10.00 | -$10.00 | $0.00 | 15.45% | 12.00% |
| 5b | | $34.80 | $245.20 | $280.00 | 1 | $0.00 | $0.00 | -$10.00 | 12.43% | 12.00% |
| 5c | | $24.80 | $255.20 | $280.00 | 1 | -$10.00 | $0.00 | -$10.00 | 8.86% | 12.00% |

Fig. 6F

Individual Level

| Day | | TA | MMDA | Total | Counter | TA | MMDA | Total | Counter | TA | MMDA | Total | Counter |
|---|---|---|---|---|---|---|---|---|---|---|---|---|---|
| | | Andrew | | | | Betty | | | | Carl | | | |
| 6 | Opening | $0.00 | $75.00 | $75.00 | 3 | $10.50 | $114.50 | $125.00 | 0 | $14.30 | $65.70 | $80.00 | 1 |
| 6a | Activity: Andrew writes a check for $45. | | | | | | | | | | | | |
| 6a | | $45.00 | $30.00 | $75.00 | 4 | $10.50 | $114.50 | $125.00 | 0 | $14.30 | $65.70 | $80.00 | 1 |
| 6b | | $0.00 | $30.00 | $30.00 | 4 | $10.50 | $114.50 | $125.00 | 0 | $14.30 | $65.70 | $80.00 | 1 |
| 6c | Settlement | $0.00 | $30.00 | $30.00 | 4 | $49.15 | $75.85 | $125.00 | 1 | $14.30 | $65.70 | $80.00 | 1 |

Custodial Level

| Day | TA | MMDA | Total | Counter | Net Balance Change | | | TTP |
|---|---|---|---|---|---|---|---|---|
| | | | | | TA | MMDA | Total | Cushion | |
| 6 | $24.80 | $255.20 | $280.00 | 1 | | | | | 12.00% |
| 6a | $69.80 | $210.20 | $280.00 | 1 | $45.00 | -$45.00 | $0.00 | 8.86% | 12.00% |
| 6b | $24.80 | $210.20 | $235.00 | 1 | $0.00 | -$45.00 | -$45.00 | 24.93% 10.55% | 12.00% |
| 6c | $63.45 | $171.55 | $235.00 | 2 | $38.65 | -$83.65 | -$45.00 | 27.00% | 27.00% |

Fig. 6G

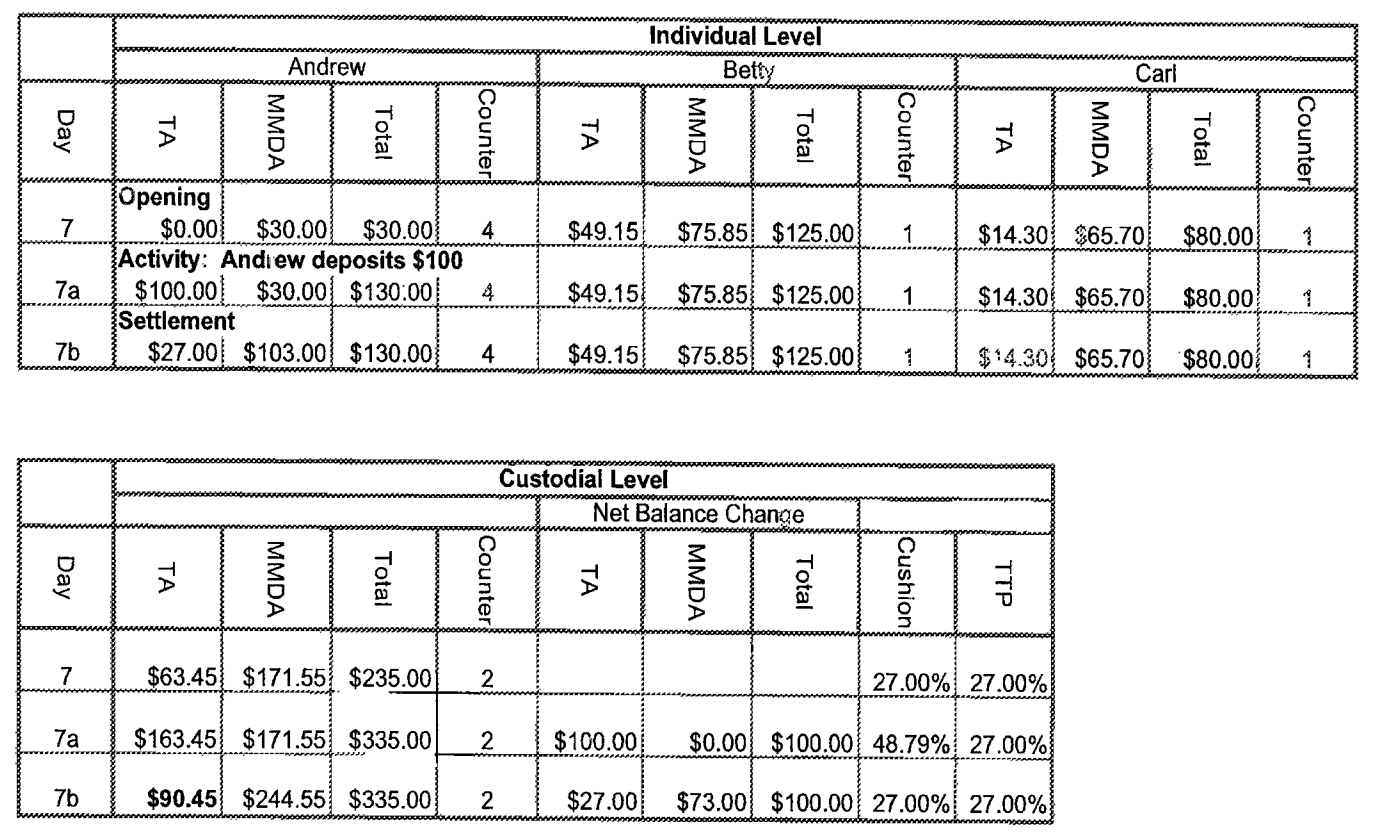

Individual Level

| Day | Andrew | | | | Betty | | | | Carl | | | |
|---|---|---|---|---|---|---|---|---|---|---|---|---|
| | TA | MMDA | Total | Counter | TA | MMDA | Total | Counter | TA | MMDA | Total | Counter |
| 7 | $0.00 | $30.00 | $30.00 | 4 | $49.15 | $75.85 | $125.00 | 1 | $14.30 | $65.70 | $80.00 | 1 |
| 7a. | Activity: Andrew deposits $100 | | | | | | | | | | | |
| | $100.00 | $30.00 | $130.00 | 4 | $49.15 | $75.85 | $125.00 | 1 | $14.30 | $65.70 | $80.00 | 1 |
| 7b | Settlement | | | | | | | | | | | |
| | $27.00 | $103.00 | $130.00 | 4 | $49.15 | $75.85 | $125.00 | 1 | $14.30 | $65.70 | $80.00 | 1 |

Custodial Level

| Day | Net Balance Change | | | | | | |
|---|---|---|---|---|---|---|---|
| | TA | MMDA | Total | Counter | TA | MMDA | Total | Cushion | TTP |

| Day | TA | MMDA | Total | Counter | TA | MMDA | Total | Cushion | TTP |
|---|---|---|---|---|---|---|---|---|---|
| 7 | $63.45 | $171.55 | $235.00 | 2 | | | | | |
| 7a. | $163.45 | $171.55 | $335.00 | 2 | $100.00 | $0.00 | $100.00 | 27.00% | 27.00% |
| 7b | $90.45 | $244.55 | $335.00 | 2 | $27.00 | $73.00 | $100.00 | 48.79% | 27.00% |

Fig. 6H

Individual Level

| Day | Andrew | | | | Betty | | | | Carl | | | |
|---|---|---|---|---|---|---|---|---|---|---|---|---|
| | TA | MMDA | Total | Counter | TA | MMDA | Total | Counter | TA | MMDA | Total | Counter |
| 8 | Opening $27.00 | $103.00 | $130.00 | 4 | $49.15 | $75.85 | $125.00 | 1 | $14.30 | $65.70 | $80.00 | 1 |
| 8a | Activity: Andrew writes a check for $110; Carl deposits $5 | | | | | | | | | | | |
| 8a | $110.00 | $20.00 | $130.00 | 5 | $49.15 | $75.85 | $125.00 | 1 | $19.30 | $65.70 | $85.00 | 1 |
| 8b | $0.00 | $20.00 | $20.00 | 5 | $49.15 | $75.85 | $125.00 | 1 | $19.30 | $65.70 | $85.00 | 1 |
| 8c | Settlement $0.00 | $20.00 | $20.00 | 5 | $88.80 | $36.20 | $125.00 | 2 | $19.30 | $65.70 | $85.00 | 1 |

Custodial Level
Net Balance Change

| Day | TA | MMDA | Total | Counter | TA | MMDA | Total | Cushion | TTP |
|---|---|---|---|---|---|---|---|---|---|
| 8 | $90.45 | $244.55 | $335.00 | 2 | | | | 27.00% | 27.00% |
| 8a | $178.45 | $161.55 | $340.00 | 2 | $88.00 | -$83.00 | $5.00 | 52.49% | 27.00% |
| 8b | $68.45 | $161.55 | $230.00 | 2 | -$22.00 | -$83.00 | -$105.00 | 29.76% | 27.00% |
| 8c | $108.10 | $121.90 | $230.00 | 3 | $17.65 | -$122.65 | -$105.00 | 47.00% | 47.00% |

METHOD, SYSTEM AND COMPUTER PROGRAM PRODUCT FOR MANAGING FUNDS IN CUSTODIAL DEPOSIT ACCOUNTS

CROSS-REFERENCE

This application is a divisional of U.S. patent application Ser. No. 12/419,691, filed Apr. 7, 2009, now U.S. Pat. No. 8,234,188, which is hereby incorporated herein in its entirety by reference hereto.

BACKGROUND OF THE INVENTION

1. Field of the Invention

The present invention relates generally to the management of financial accounts and more particularly, to a method, system and computer program product for managing funds in custodial deposit accounts.

2. Background Art

Through a custodial arrangement, deposit accounts may be established at one or more depository institutions by an agent and/or custodian on behalf of a plurality of customers. (Such deposit accounts are referred to herein as "omnibus" deposit accounts.) The agent and/or custodian responsible for establishing and holding such deposit accounts may be, for example, a broker-dealer registered under the Securities Exchange Act of 1934 as amended (referred to herein as a "broker-dealer"), another depository institution, a credit union, or another regulated financial institution. (Such agent and/or custodian is referred to herein as a "custodial agent").

Custodial agents that are registered broker-dealers typically offer their customers various types of liquid investments into which customer "free credit balances," as defined in Rule 15c3-3 adopted by the SEC pursuant to the Exchange Act, are automatically invested, or "swept," from a customer's brokerage account. A free credit balance is created in a customer's brokerage account when the customer sells investments in the account, the customer receives interest or dividend payments on investments in the account or the customer deposits funds in the account. As a service to their customers, broker-dealers can offer to automatically invest, or "sweep," customers' free credit balances into liquid investments. If the customer then needs funds to settle securities transactions or for cash management activity, the broker-dealer withdraws funds to cover such transactions. An automated service that sweeps customers' end-of-day cash, for example, into an interest-bearing account affords customers an opportunity to receive interest on excess cash that would otherwise not earn interest.

Broker-dealers also commonly offer customers check-writing, debit card and other cash management features in connection with brokerage accounts. Debits in a customer's brokerage account created by check, debit card, purchases of securities or other transactions are typically satisfied from available cash balances, funds in the customer's sweep investment and, if applicable, margin credit. A sweep investment, therefore, may be offered to a broker-dealer's customers as part of a cash management component of a brokerage account.

Funds deposited in deposit accounts, in some banking systems around the world, are insured by government-run deposit insurance programs up to an established deposit insurance limit. In the United States, for example, such deposits are insured by the Federal Deposit Insurance Corporation (FDIC). The FDIC currently insures deposits up to $100,000 per depositor in any one insured depository institution for many insurable capacities (e.g., individual accounts and joint accounts) and up to $250,000 for IRAs and certain self-insured employee benefit plans. The basic deposit insurance limit was temporarily raised on Oct. 3, 2008 by the Emergency Economic Stabilization Act of 2008 from $100,000 to $250,000 per depositor. This increase is scheduled to end and return to $100,000 per depositor after Dec. 31, 2009.

One option for broker-dealers and other custodial agents is for the custodial agent to place customer funds in a plurality of depository institutions in amounts that do not exceed the deposit insurance limit for each customer at each depository institution, permitting customer funds to be eligible for insurance coverage in excess of the basic FDIC limit. A sweep arrangement in which customer funds are placed in deposit accounts at a plurality of depository institutions (a "multi-bank sweep arrangement") can benefit participating depository institutions by providing a large, stable source of deposits. A multi-bank sweep arrangement can also benefit customers, by offering additional investment opportunities together with increased access to FDIC deposit insurance protection. Even without regard to FDIC deposit insurance protection, a multi-bank sweep arrangement can spread and thereby mitigate risk and can provide greater access to competitive returns.

Swept customer funds that are placed in deposit accounts at a plurality of depository institutions may be deposited in interest-bearing money market deposit accounts ("MMDAs"), however, such MMDAs are not transaction accounts. In the United States, for example, Regulation D of the Board of Governors of the Federal Reserve System ("Regulation D") limits transfers from an MMDA to six per calendar month or other statement cycle. Accordingly, funds swept into MMDAs must be properly managed so that transfers from MMDAs are in compliance with transaction limits.

FDIC-insured sweep services have been in use by broker-dealers since at least the early 1980s, when Merrill Lynch offered a sweep option to its brokerage customers under which funds were swept into Omnibus MMDAs at multiple banks. Continuing through the 1990s, other broker-dealers offered similar services to their clients. Some such services sought to invoke the messenger exception of Regulation D, 12 C.F.R. §204.2(d)(2), to permit unlimited transfers from an Omnibus MMDA, but such an approach was contrary to Federal Reserve guidance. As a result, most such services either relied on transfer limitations at the Individual MMDA level or attempted other ways of overcoming the limitations, such as moving funds among banks. These services were frequently combined with other well-known features in the financial services industry, such as ATM cards, credit cards, checking, interest rate incentives, benefits for large depositors and preferred customers, and the like. None of the services operated as is described here, including limiting transfers from the Omnibus MMDA as well as the Individual MMDA (e.g., to six per month) through retaining portions of the deposited funds in Individual TAs to offset net transfers from the Omnibus MMDA that would otherwise occur.

BRIEF SUMMARY OF THE INVENTION

The present invention is directed to a method, system and computer program product for managing aggregate funds held in custodial deposit accounts by a custodial agent on behalf of a plurality of individuals. According to the present invention, the custodial deposit accounts comprise an omnibus transaction account ("Omnibus TA") and an omnibus money market deposit account ("Omnibus MMDA"). A corresponding individual transaction account ("Individual TA") and individual money market deposit account ("Individual MMDA") are kept on the books and records of the custodial agent for each individual, representing the amount of the individual's funds deposited in the Omnibus TA and Omnibus MMDA, respectively. According to the present invention, transfers from the Omnibus MMDA to the Omnibus TA are reduced by daily allocation of the funds in the Individual TAs and Individual MMDAs, thereby decreasing the likelihood that an established transfer limit for the Omnibus MMDA (e.g. the limit of six transfers per month in Regulation D) will be reached.

In one embodiment, an Individual TA data set comprising Individual TA data representative of the amount of the individual's funds allocated to the Omnibus TA and an Individual MMDA data set comprising Individual MMDA data representative of the amount of the individual's funds allocated to the Omnibus MMDA are established for each individual in a memory of a computer. Also, an Omnibus TA data set representative of the amount of the aggregate funds allocated to the Omnibus TA and an Omnibus MMDA data set representative of the amount of the aggregate funds allocated to the Omnibus MMDA are established in the memory of the computer. A processor of the computer receives individual transaction data representative of individual withdrawals and/or deposits by one or more of the plurality of individuals. The processor modifies the Individual TA data and the Individual MMDA data for one or more of the plurality of individuals to reflect a net change to the amount of the individual's funds allocated to the Omnibus TA and the Omnibus MMDA, respectively, based on the received individual transaction data and stores the modified Individual TA data in the Individual TA data set and the modified Individual MMDA data in the Individual MMDA data set. Thereafter, the processor compares the Individual MMDA data and the Omnibus MMDA data, calculates a net adjustment to be made to the amount of funds in the Omnibus MMDA, and stores the net adjustment in a memory of the computer. The processor compares the net adjustment to the Omnibus TA data and, if said net adjustment is a negative net balance change in an amount not greater than the amount of funds in the Omnibus TA, the processor further modifies the Individual TA data and the Individual MMDA data for one or more of the plurality of individuals to offset the net adjustment and stores the further modified Individual TA data in the Individual TA data set and the further modified Individual MMDA data in the Individual MMDA data set. Then, the processor modifies the Omnibus TA data based on the Individual TA data stored in the Individual TA data set and modifies the Omnibus MMDA data based on the Individual MMDA data stored in the Individual MMDA data set.

In another embodiment, a processor receives net daily transaction data for one or more of the plurality of individuals representative of a net daily withdrawal from or a net daily deposit to the custodial deposit accounts and stores the net daily transaction data in a memory of a computer. The processor derives a net balance change data for the Omnibus MMDA from the net daily transaction data and stores the derived net balance change data in the memory. The processor compares the derived net balance change data to data representing the amount of funds in the Omnibus TA and, if the derived net balance change data is a negative net balance change in an amount not greater than the amount of funds in the Omnibus TA, the processor modifies the Individual TA data and the Individual MMDA data for one or more of the plurality of individuals to offset the net adjustment and stores the further modified Individual TA data in the Individual TA data set and the further modified Individual MMDA data in the Individual MMDA data set. Then, the processor modifies the Omnibus TA data based on the Individual TA data stored in the Individual TA data set and modifies the Omnibus MMDA data based on the Individual MMDA data stored in the Individual MMDA data set.

In another embodiment, at the beginning of a period of time, a processor allocates a percent greater than 0% of the aggregate funds to the Omnibus TA, such that each of the individuals has funds allocated to both the Omnibus TA and the Omnibus MMDA. Thereafter, the processor receives net daily transaction data for one or more of the plurality of individuals representative of a net daily withdrawal from or a net daily deposit to the custodial deposit accounts and stores the net daily transaction data in a memory of a computer. The processor determines whether the net daily transaction data will result in an aggregate transfer of funds from the Omnibus MMDA to the Omnibus TA. If the net daily transaction data will result in an aggregate transfer of funds from the Omnibus MMDA to the Omnibus TA, the processor modifies the Individual TA data and the Individual MMDA data for one or more of the plurality of individuals to offset the net adjustment and stores the further modified Individual TA data in the Individual TA data set and the further modified Individual MMDA data in the Individual MMDA data set. Then, the processor modifies the Omnibus TA data based on the Individual TA data stored in the Individual TA data set and modifies the Omnibus MMDA data based on the Individual MMDA data stored in the Individual MMDA data set.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

Figure 1:
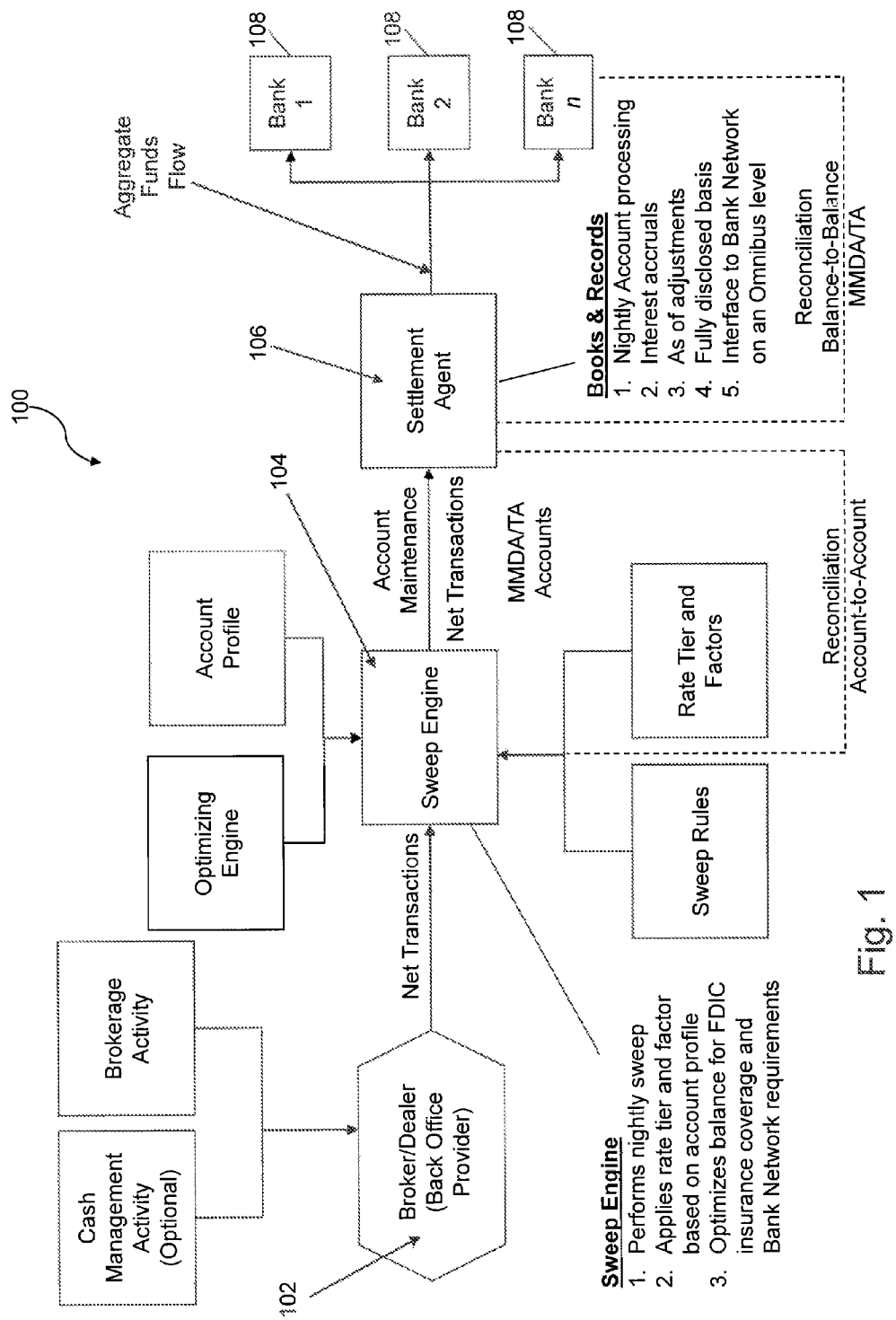
FIG. 1 is a block diagram of an exemplary deposit sweep program according to the present invention.

FIG. 6A provides a table representative of data produced by an exemplary deposit sweep engine processor managing custodial deposit accounts according to one embodiment of the present invention for a first day.

FIG. 6B provides a table representative of data produced by an exemplary deposit sweep engine processor managing custodial deposit accounts according to one embodiment of the present invention for a second day.

FIG. 6C provides a table representative of data produced by an exemplary deposit sweep engine processor managing custodial deposit accounts according to one embodiment of the present invention for a third day.

FIG. 6D provides a table representative of data produced by an exemplary deposit sweep engine processor managing custodial deposit accounts according to one embodiment of the present invention for a fourth day.

FIG. 6E provides a table representative of data produced by an exemplary deposit sweep engine processor managing custodial deposit accounts according to one embodiment of the present invention for a fifth day.

FIG. 6F provides a table representative of data produced by an exemplary deposit sweep engine processor managing custodial deposit accounts according to one embodiment of the present invention for a sixth day.

FIG. 6G provides a table representative of data produced by an exemplary deposit sweep engine processor managing custodial deposit accounts according to one embodiment of the present invention for a seventh day.

FIG. 6H provides a table representative of data produced by an exemplary deposit sweep engine processor managing custodial deposit accounts according to one embodiment of the present invention for an eigth day.

DETAILED DESCRIPTION OF THE INVENTION

The present invention manages funds held in custodial deposit accounts so as to limit transfers of funds from money market deposit accounts at both the individual and omnibus account levels in a dual account structure to a specified number per month or other statement cycle, as may be required by regulation, while preserving customer access to funds through transaction accounts with unlimited transfers. Transfers are limited for both the Individual MMDA and the Omnibus MMDA through managed allocation of funds in Individual TAs and Individual MMDAs.

An exemplary embodiment of the present invention is now described with reference to the figures, where like reference numbers indicate identical or functionally similar elements. This is for convenience only and is not intended to limit the application of the present invention. In fact, after reading the following description, it will be apparent to one skilled in the relevant art(s) how to implement the following invention in alternative embodiments. While the following embodiment is directed to a deposit sweep program between a broker-dealer and a plurality of its customers, it will be understood that this is an embodiment of the present invention and that the present invention can be applied in other arrangements where a custodial agent is an agent and or custodian for a plurality of individuals.

In one embodiment, each custodial agent establishes a money market deposit account ("MMDA") and a transaction account ("TA") with each depository institution in the name of the custodial agent as agent and/or custodian for its customers. These accounts are referred to herein as the "Omnibus" MMDA (OMMDA) and the "Omnibus" TA (OTA). Under Regulation D, the Omnibus MMDA is subject to lower reserve requirements than the Omnibus TA. Accordingly, it is desired that a maximum of the deposited funds at each depository institution be placed in the Omnibus MMDA. Regulation D currently limits transfers from money market deposit accounts to six per calendar month or other statement cycle. Consequently, according to the present invention, a set percent of the deposited funds is retained in the Omnibus TA, as discussed further below, as a cushion to satisfy withdrawals. The percent of the deposited funds retained in the Omnibus TA is referred to herein as the target OTA percent (TTP).

Individual MMDAs and TAs for each customer are also established, as evidenced by books and records maintained by the custodial agent. These accounts are referred to herein as the "Individual" MMDA (IMMDA) and the "Individual" TA (ITA). In order to comply with banking regulations, fund withdrawals to outside entities are directed from the Individual TA and the entire balance in the Individual MMDA account is transferred to the Individual TA before the customer exhausts the monthly transfer limit. The Individual TA may be, for example, a negotiable order of withdrawal (NOW) account.

In one embodiment, each depository institution agrees to pay an "all-in cost of funds" in respect of the money held in the custodial deposit accounts. For example, the "all-in cost of funds" may be based on the Federal Funds Effective Rate plus a set basis point spread. This "all-in cost of funds" can then be allocated into interest to be paid into the custodial deposit accounts and fees paid to the custodial agent and/or others involved in the maintenance and operation of the deposit sweep arrangement, such as a third party manager or administrator. Interest paid into the custodial deposit accounts is allocated to the Individual MMDAs and the Individual TAs on the books and records of the custodial agent, as would be apparent to one of ordinary skill in the art, based on each customer's individual account balances. Each customer earns interest on all funds deposited in the IMMDA and the ITA. Accordingly, it is irrelevant to the customer whether the customer's swept funds are allocated to the customer's Individual MMDA or to the customer's Individual TA.

Custodial agents may place customer funds in a plurality of depository institutions in amounts that do not exceed the deposit insurance limit for each customer at each depository institution, permitting customer funds to be eligible for insurance coverage in excess of the basic FDIC limit. To the extent a customer has funds swept into more than one depository institution, the custodial agent will maintain separate Individual TA and Individual MMDA accounts on its books and records for the customer corresponding to the Omnibus TA and Omnibus MMDA at each depository institution. In one embodiment, customer funds are deposited and withdrawn at one or more depository institutions according to a first in first out (FIFO) accounting basis.

According to the present invention, transfer limitations, such as the limitation under Regulation D of 6 transfers per month or other statement cycle, can be managed for both the Individual MMDA and the Omnibus MMDA by managed allocation of funds in the Individual TAs and Individual MMDAs, as described below with respect to FIGS. 2-4.

FIG. 1 is a block diagram providing an overview of the flow of customer funds in an exemplary deposit sweep arrangement 100 according to the present invention. Deposit sweep arrangement 100 includes a broker-dealer back office service provider 102, a deposit sweep engine 104, a settlement agent 106 and one or more depository institutions 108. In one embodiment, deposit sweep engine 104 is operated by a third party agent or administrator that reports to both the custodial agent and the depository institutions. The agent or administrator manages transfers of funds between the individual sweep accounts of each customer and the custodial accounts held at the depository institutions. As discussed below, deposit sweep engine 104 may be implemented using hardware, software or a combination thereof and may be implemented in one or more computer systems or other processing systems. For each depository institution, deposit sweep engine 104 allocates funds deposited in the Omnibus TA and Omnibus MMDA and allocates funds within Individual TAs and Individual MMDAs, representing each individual's portion of the aggregate funds deposited in the custodial deposit accounts as recorded on the books of the custodial agent, and provides instructions to the depository institutions and custodial agent as to the allocation of such funds.

Back office service provider 102 collects brokerage activity and cash management activity of customers of the broker-dealer and transmits net customer transactions to sweep engine 104. Sweep engine 104 performs a daily sweep, for example, at night. Sweep engine 104 optimizes swept balances for FDIC insurance coverage and bank network requirements. The allocation and posting processing of sweep engine 104 is further discussed below with respect to FIGS. 2-4. Sweep engine 104 transmits aggregate transactions to settlement agent 106. Settlement agent 106 provides an interface to the bank network on an aggregate level (e.g., omnibus level rather than customer level). Settlement agent 106 sends aggregate funds flow to one or more depository institutions 108 in the bank network. Settlement agent 106 processes aggregate transactions daily, for example, at night. Aggregate funds are invested in omnibus accounts at each depository institution 108.

In accordance with an embodiment of the invention, communication of information between the various components of deposit sweep arrangement 100 is accomplished over a network consisting of electronic devices connected either physically or wirelessly, wherein digital information is transmitted from one device to another. Such devices may include, but are not limited to, a desktop computer, a laptop computer, a handheld device or PDA, a telephone, a set top box, an Internet appliance, or the like. Exemplary networks include a Local Area Network, a Wide Area Network, an organizational intranet, the Internet, or the like. The functionality of an exemplary computer and network are further explained in conjunction with FIG. 5, below.

System balancing is divided into five phases that serve as building blocks on each other starting with the net daily activity received from back-office service provider 102 and concluding with settlement agent 106 reconciliation. By dividing this process into phases it is possible to detect an out-of-balance condition before starting the end of day funds transfer process.

The first phase balances the data received from the broker-dealer back office service provider against the data accepted by the sweep engine. All inbound activity files contain a trailer record that stores the number of records on the file and the total of all debit and credit transactions. During the file processing and parsing process, the three data values referenced are internally computed and stored. When the inbound activity file processing is complete the internally computed record count, aggregated debit and credit transactions are matched to the values stored on the inbound trailer record. These values must be in agreement for processing to continue.

After the inbound activity file is successfully balanced, the sweep engine will begin core processing or allocation of the net daily activity, described below with respect to FIGS. 2-4. A second balancing phase occurs during the allocation and posting process, when the sweep engine internally counts the number of transactions received and accumulates the value of credits and debits received. At the conclusion of the processing, these values are compared against the retained control totals from an internal transmission balancing process. This is done to confirm that all transactions provided to the sweep engine have either been posted to the account or, in the case of an error, duly reported.

As a result of the allocation and posting processing, the sweep engine will create a funds transfer report detailing the allocation of the daily activity among the various depository institutions. As a third balancing phase, the total sum of funds allocated across these depository institutions should balance to the net total of credits and debits processed in the allocation and posting phase.

After the final allocation and posting of daily activity transactions, the settlement agent will receive an electronic transmission of wire instructions from or on behalf of the custodial agent. The wires will be posted to a settlement account pending transmissions to/from the depository institutions. A fourth balancing phase occurs at the conclusion of the day, when the settlement account is reconciled to validate that all transmissions have been completed and that expected funds from the depository institutions were received. The net balance of the settlement account should equal the net total on an expected funds settlement balancing report.

On the day following system processing, the custodial accounts balances and accrued interest from the depository institutions will be obtained for balancing against derived aggregate deposit balances (e.g., as calculated by applying the all-in rate to the individual account balances) stored within the sweep engine. The first three phases of reconciliation described above can be monitored and verified by a series of daily reports. The settlement agent contracts with the custodial agent to perform the fourth level of reconciliation described above utilizing standard reconciliation processes which include daily verification of "zero balances" in all settlement accounts. The fifth phase of reconciliation may be performed by utilizing a reconciliation dashboard, such as disclosed in pending U.S. patent application Ser. No. 11/556, 662, incorporated herein by reference in its entirety As discussed above, in the United States, for example, Regulation D limits transfers from an MMDA account to six per month or other statement cycle. During the allocation and posting processing, sweep engine 104 manages allocation of funds swept into the Individual and Omnibus TAs and MMDAs on a daily and monthly (or other periodic) basis, so that transfers from the Individual and Omnibus MMDAs are limited.

In one embodiment, the allocation and posting processing are incorporated into deposit sweep engine 104. Data registers or data sets are established in an allocation database for storing data representative of the amount of funds deposited in the Omnibus TA and the Omnibus MMDA. Data registers or data sets are also established in the allocation database for each customer for storing data representative of the allocation of funds between the customer's Individual TA and Individual MMDA. The Individual TAs and MMDAs correspond to the Omnibus TA and Omnibus MMDA at each depository institution, such that the sum of the balances recorded in the Individual TAs is equal to the balance of funds deposited in the Omnibus TA and the sum of the balances recorded in the Individual MMDAs is equal to the balance of funds deposited in the Omnibus MMDA. Data registers or data sets are also established for storing data representative of the number of transfers from the Individual MMDA and Omnibus MMDA for use in tracking regulatory compliance. For example, an IMMDA transfer counter and OMMDA transfer counter are established in the deposit sweep engine database for storing data representative of the number of transfers from the IMMDA and OMMDA, respectively.

In one embodiment, to aide in regulatory compliance, at the start of each month, a set percent of the aggregate deposited funds is retained in the Omnibus TA, for example 1%, 5%, or any other percent, may be retained in the Omnibus TA. It is desirable that this set percent, or target OTA percent (TTP), be as small as possible. The TTP may be based on a number of factors, such as transaction history in the individual and/or custodial deposit accounts, or may be set arbitrarily, as would be apparent to one of ordinary skill in the art. Additionally, as would be apparent to one of ordinary skill in the art, the TTP may be optimized so that the minimum amount of funds are kept in the Omnibus TA while still ensuring compliance with transfer limits. For example, the TTP may be managed and altered during the calendar month or other statement cycle, as discussed below.

In one embodiment, the target OTA percent (TTP) can be set lower, but increased during the month or statement cycle each time a transfer is required from the OMMDA. To that end, during each transfer from the OMMDA during the month or statement cycle, sufficient funds are transferred to increase the TTP to a larger percentage based on the number of remaining transfers (as represented by the OMMDA transfer counter). For example, the month or statement cycle may begin with the TTP set to 1% and the OMMDA transfer counter set to 0. When a first transfer from the OMMDA is needed during the month or statement cycle, the OMMDA transfer counter in increased to 1 and the TTP is raised to 3%. The Individual TA data and the Individual MMDA data are modified for one or more of the plurality of individuals so that the OTA will contain 3% of the total omnibus funds after settlement of the account. If a second transfer is needed from the OMMDA during the month or statement cycle, the OMMDA transfer counter is incremented from 1 to 2 and the TTP is raised to 4%. If a third transfer is needed during the month or statement cycle, the OMMDA transfer counter is incremented from 2 to 3 and the TTP is raised to 5%. If a fourth transfer from the OMMDA is needed during the month or statement cycle, the OMMDA transfer counter is incremented from 3 to 4 and the TTP is raised to 10%. If a fifth transfer is required during the month or statement cycle, the OMMDA transfer counter is incremented from 4 to 5 and the TTP is raised to 20%. Finally, if a sixth transfer is needed (and if six transfers is the transfer limit), the OMMDA transfer counter is incremented from 5 to 6 and the TTP is raised to 100%. In other words, as discussed herein, when the transfer limit is reached, the Individual TA data and the Individual MMDA data are modified so that the entire balance of each Individual MMDA is transferred to its respective Individual TA. The exact percentages for the TTP that correspond to each transfer can be modified as would be apparent to one of skill in the art, to optimize the process. For example, percentages may be set differently depending on how large the depository institution's balances are, since banks with large balances tend to have a lower percentage of outbound transfers.

Further, in another embodiment, the TTP may be reduced at the end of the calendar month or other statement cycle, if the number of transfers from the OMMDA to the OTA during the month were low as compared to the transfer limit. For example, if there are four transfers remaining before reaching a transfer limit of six in a given calendar month or statement cycle (i.e. the OMMDA transfer counter is less than three), but only three days remaining in the calendar month or statement cycle, the TTP can be reduced to 0% for the remainder of the calendar month or statement cycle, since there can be transfers out of the OMMDA each of the remaining days of the month or statement cycle without reaching the transfer limit.

Despite any modifications made to the TTP during the month or statement cycle, the TTP can be reset (e.g., returned to 1%) at the start of the following calendar month or statement cycle as discussed further below with respect to FIG. 4.

On a regular periodic basis, e.g., daily, a deposit sweep engine processor receives customer transaction data from back office service provider 102 representative of a daily deposit and withdrawal information for each customer. In one embodiment, the customer transaction data is a daily net deposit or daily net withdrawal made by each individual. As discussed above, the sweep engine processor optimizes swept balances for FDIC insurance coverage and bank network requirements, in some instances splitting swept balances among a plurality of banks, in amounts that do not exceed the deposit insurance limit for each customer at each depository institution, permitting customer funds to be eligible for insurance coverage in excess of the basic FDIC limit. As would be apparent to one of skill in the art, during the allocation and posting processing, tests are performed relating to each net customer transaction to ascertain whether or not the customer has a sufficient balance to satisfy the desired transfer. Then, for each depository institution, the sweep engine processor determines an aggregate amount of funds to be deposited or withdrawn from the Omnibus TA and Omnibus MMDA to cover the customer activity, based on the net daily transaction data, and allocates funds for each Individual TA and Individual MMDA corresponding to the custodial deposit accounts. Funds needed for satisfaction of transfers out of the individual sweep accounts are satisfied by funds withdrawn in the aggregate from the custodial accounts and funds transferred into the individual sweep accounts are deposited in the aggregate to the custodial accounts.

Figure 2:
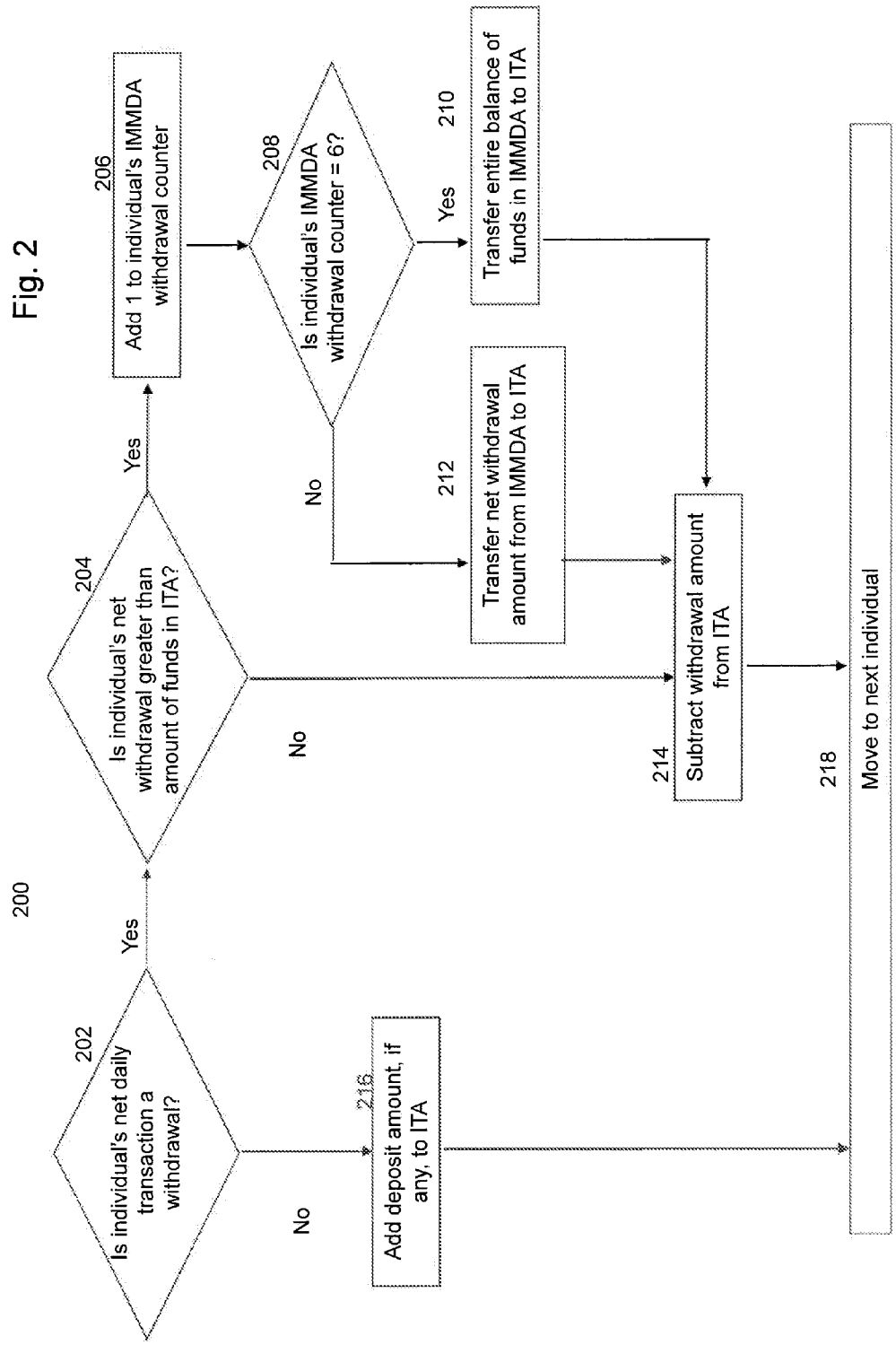
FIG. 2 is a flowchart providing one embodiment of a process for allocating funds in Individual TAs and Individual MMDAs.

FIG. 2 is a flow chart providing an example of an allocation process 200 that allocates deposits and withdrawals on the individual account level for both the IMMDA and ITA. The deposit sweep engine processor reads the customer transaction data and first determines whether the customer's net daily transaction is a withdrawal (step 202). If it is not a withdrawal, the processor adds the net daily deposit amount, if any, to the customer's ITA (step 216). The processor then moves to the next customer, if any, and starts over (step 218). If there are no remaining customers, the processor proceeds to step 302, as discussed below with respect to FIG. 3.

Beginning with the first customer, if the customer's net daily transaction is a withdrawal, the deposit sweep engine processor determines whether the customer's net withdrawal is greater than the amount of funds in the customer's ITA (step 204). If the net withdrawal is not greater than the amount of funds in the ITA, the processor subtracts the withdrawal amount from the ITA (step 214). The processor then moves to the next individual, if any, and starts over (step 218). If, however, the net withdrawal is greater than the amount of funds in the ITA, the processor adds 1 to the individual's IMMDA transfer counter (step 206). The processor then determines whether the individual's IMMDA transfer counter is equal to 6 or some other established transfer limit (step 208). If the counter is equal to the transfer limit, the processor transfers the entire balance of funds in the IMMDA to the ITA (step 210). If it is less than the transfer limit, the processor transfers the net withdrawal amount from the IMMDA to the ITA (step 212). In either case, the processor will then subtract the withdrawal amount from the ITA (step 214). The processor then moves to the next individual, if any, and starts over (step 218).

As a result of allocation process 200, the deposit sweep engine processor updates the allocation database for each customer's ITA and IMMDA account based on the allocations described above.

Figure 3:
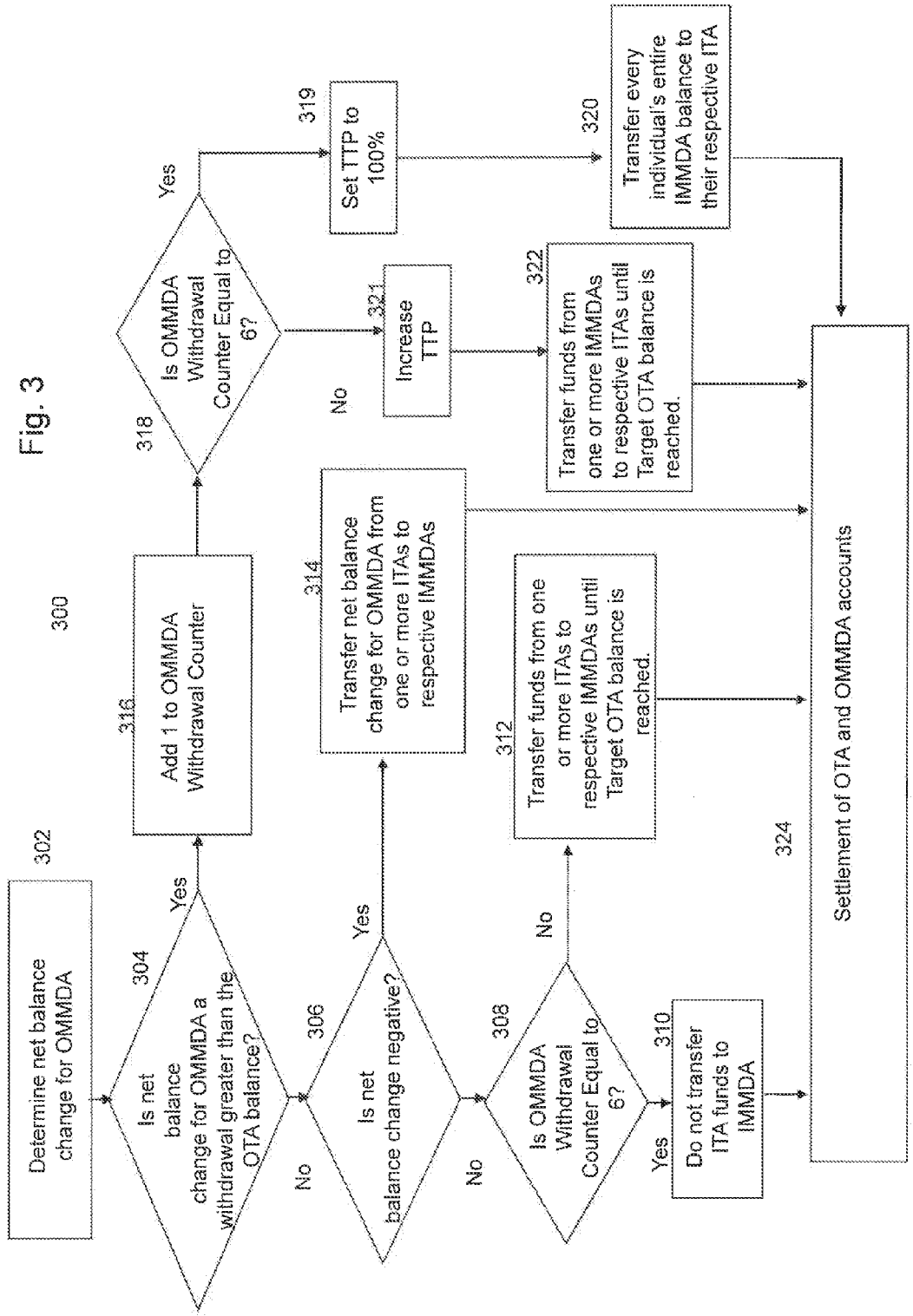
FIG. 3 is a flowchart providing one embodiment of a process for allocating aggregate funds in an Omnibus TA and an Omnibus MMDA.
Figure 4:
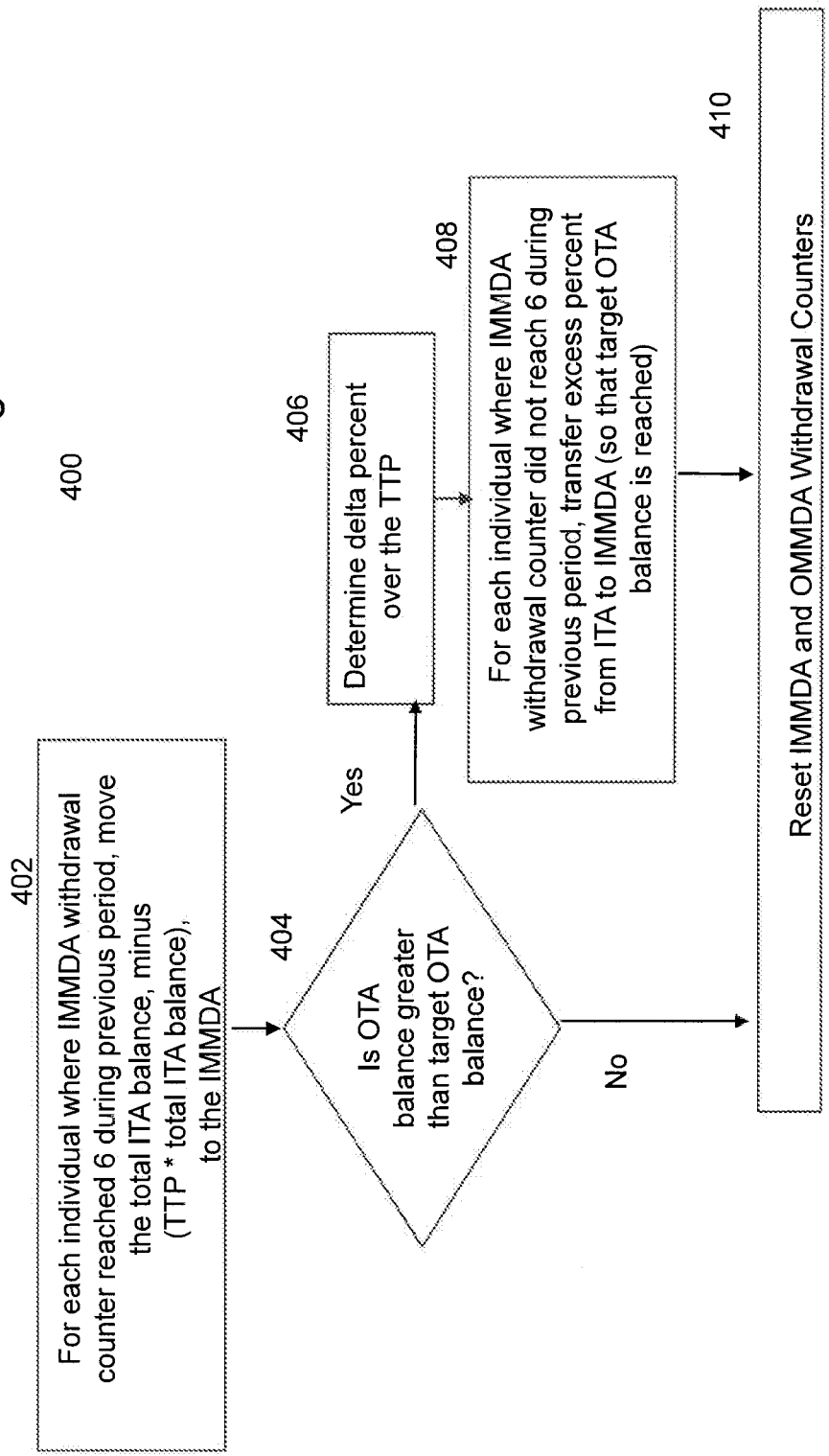
FIG. 4 is a flowchart providing one embodiment of a rebalancing process for allocating funds in Individual TAs and Individual MMDAs at the beginning of each month or statement cycle.

FIG. 3 is a flow chart providing an example of an allocation process 300 that allocates ITA and IMMDA balances on the customer account level to minimize the number of transfers from the OMMDA for a given period. After allocation process 200 has concluded, the deposit sweep engine processor first determines the net balance change for the OMMDA (step 302), based on a comparison of a sum of the data generated for each customer's IMMDA during allocation process 200 against the data received from the depository institution and/or stored in the allocation database representing the current balance of funds in the OMMDA. The deposit sweep engine processor then determines whether the net balance change for the OMMDA is a negative amount greater than the OTA balance (step 304), by comparison to the data received from the depository institution and/or stored in the allocation database representing the current balance of funds in the OTA.

If the net balance change for the OMMDA is a negative amount greater than the OTA balance, the processor adds 1 to the OMMDA transfer counter (step 316). Next, the processor determines whether the OMMDA transfer counter is equal to 6 or some other established transfer limit (step 318). If the OMMDA transfer counter is equal to the transfer limit, then the processor sets the TTP to 100% (step 319) and transfers every individual's entire IMMDA balance to their respective ITA (step 320). If it is not equal to the transfer limit, the processor increases the TTP to a larger percentage based on the number of remaining transfers (step 321) and transfers funds from one or more of the plurality of individual's IMMDA to their respective ITA until the Target OTA balance is reached (step 322).

If the net balance change for the OMMDA is not a negative amount greater than the OTA balance, the processor then determines whether the net balance change is negative (step 306). If the net balance is negative, the processor transfers funds from one or more ITAs to their respective IMMDAs until the net balance change amount is reached (step 314). In one embodiment, the processor determines which, if any, customers hold eligible ITA balances. Eligible customers have IMMDA transfer counters of less than 6 or some other established transfer limit. Then, beginning with eligible customers that hold the largest ITA balances, the processor transfers all or a portion of the ITA balance to the respective IMMDA. When the net balance change amount is reached, the processor stops ITA balance transfer processing. If the net balance change is exceeded with the transfer of funds from a single ITA, the processor transfers only the funds required. The processor repeats this determination-and-transfer process until the OMMDA net balance change is reduced to zero.

If, on the other hand, the net balance change for the OMMDA is not a negative amount greater than the OTA balance and the net balance change is not negative, the processor first determines whether the OMMDA transfer counter is equal to 6 or some other transfer limit (step 308). If the OMMDA transfer counter is equal to the transfer limit, the processor does not transfer any ITA funds to the IMMDA (step 310). If the OMMDA transfer counter is not equal to the transfer limit, the processor transfers funds from one or more ITAs to their respective IMMDAs until the Target OTA balance is reached (step 312).

For example, in one embodiment, in step 312, the processor determines whether the OTA balance is greater than the target OTA balance. The target OTA balance is calculated by multiplying the target OTA percent (TTP), discussed above, by the sum total of the OMMDA and OTA balances. If the OTA balance is greater than the target OTA balance, then the processor transfers funds from the ITAs to the IMMDAs until the target OTA is reached. Beginning with customers that hold the largest ITA balance, the processor transfers funds from the ITAs to the IMMDAs. When the target OTA balance is reached, the processor stops transferring funds from the ITAs. If the target OTA balance is reached with funds from a single ITA, the processor only transfers the funds required from that customer's ITA.

As a result of allocation process 300, the processor updates the database for the Omnibus TA and Omnibus MMDA, as well as each customer's ITA and IMMDA, based on the allocations described above.

The sweep engine processor then creates a funds transfer report for each depository institution detailing the allocation of the daily activity among the OTA and OMMDA, as well as instructions for either a net withdrawal from or net deposit to the custodial deposit accounts, for daily settlement of the OTA and OMMDA accounts (step 324). The settlement agent receives an electronic transmission of wire instructions from or on behalf of the custodial agent and then transmits funds to or from the depository institutions based on those instructions. The sweep engine process also creates a funds allocation report detailing the allocation of the daily activity between each customer's Individual TA and Individual MMDA and forwards such instructions to the custodial agent for reconciliation with the custodial agent's books and records for each customer The allocation processes described with respect to FIGS. 2 and 3 are repeated on a daily basis during the calendar month or other statement cycle. Additionally, at the beginning of each month or other statement cycle, a rebalance process 400 is employed for rebalancing the ITA and IMMDA accounts, as shown in FIG. 4. The processor reviews the data sets representative of the amount of funds allocated to the individual and omnibus accounts as well as the IMMDA transfer counter for the previous month or statement period.

For each customer where the IMMDA transfer counter reached 6 during the previous period, the processor transfers from the ITA to the respective IMMDA an amount of funds equal to the total ITA balance minus the product of the target OTA percent (TTP) and the total ITA balance (step 402). In this manner, only the target OTA percent of the total ITA balance of funds is retained in the ITA with the remainder of the funds allocated to the IMMDA. After such reallocation for each customer where the IMMDA transfer counter reached 6 during the previous period, the processor then determines a modified OTA and OMMDA balance based on the rebalancing in step 402 and determines whether the OTA balance is now greater than the target. OTA balance (step 404). As discussed above, the target OTA balance is calculated by multiplying the target OTA percent (TTP) by the sum total of the OMMDA and OTA balances. If the OTA balance is not greater than the target OTA balance, the processor makes no further modification to the allocation of funds in the ITAs and IMMDAs.

If the OTA balance is greater than the target OTA balance, the processor determines the delta or excess percent over the target OTA percent (TTP) (step 406). In particular, the processor determines the delta or excess percent by calculating the percent of funds in the customer ITAs for the customers where the IMMDA transfer counter did not reach 6 during the previous period, as compared to the total balance of funds in both the ITAs and IMMDAs for the customers where the IMMDA transfer counter did not reach 6 during the previous period. The target OTA percent (TTP) is then subtracted from this calculated percent. Next, for each customer where the IMMDA transfer counter did not reach 6 during the previous period, the processor transfers the delta or excess percent from the ITA to the IMMDA, so that the target OTA balance is reached (step 408). For example, if the TTP is set at 1%, but the sum of the funds allocated to the ITAs for the customers where the IMMDA transfer counter did not reach 6 during the previous period, as compared to the total balance of funds in both the ITAs and IMMDAs for the customers where the IMMDA transfer counter did not reach 6 during the previous period is 3%, then 2% of the balance of funds in the ITAs of each customer where the IMMDA transfer counter did not reach 6 during the previous period is transferred to their respective IMMDA. After steps 402 and 408, the OTA balance will be reached.

The processor finishes rebalance process 400 by resetting the IMMDA and OMMDA transfer counters to zero (step 410). One of ordinary skill in the art will appreciate that a more elaborate rebalancing process could also be employed to further optimize the allocation of funds, so that a minimum amount of funds are kept in the Omnibus TA while still ensuring compliance with established transfer limits. For example, whereas in the embodiment described above, the TTP is returned to at a set percent (e.g., 1%) at the beginning of each month or statement cycle, in an alternative embodiment, the TTP could be increased or decreased on a monthly or other periodic basis based on activity in the individual and custodial deposit accounts, as would be apparent to one of ordinary skill in the art, so that a minimum amount of funds are kept in the Omnibus TA while still ensuring compliance with established transfer limits.

As a result of the monthly rebalance process, the deposit sweep engine processor creates a funds transfer report detailing the rebalancing allocation for the OTA and OMMDA accounts. The settlement agent then receives an electronic transmission of wire instructions from or on behalf of the custodial agent and transmits these instructions to the depository institution to reallocate funds in the custodial deposit accounts. Similarly, instructions are provided to the custodial agent to rebalance funds allocated to the Individual TAs and Individual MMDAs on the books and records of the custodial agent.

According to the present invention, a plurality of customers of a custodial agent are provided with FDIC insurance for funds in excess of $100,000 at an agreed-to interest rate. The depository institutions are provided with a stable source of funds with reduced reserve requirements. The custodial agent and the agent or administrator receive fees from the "all in cost of funds" paid by the depository institution for managing allocation of funds at the individual and custodial levels and for facilitating transfers between the individual accounts and the custodial accounts to satisfy daily transactions. Regulatory compliance is managed through allocation of funds in the individual accounts by the deposit sweep engine processor prior to instructing the depository institutions as to the omnibus account, such that a minimum or reduced amount of funds are kept in the Omnibus TA while still limiting transfers.

Figure 5:
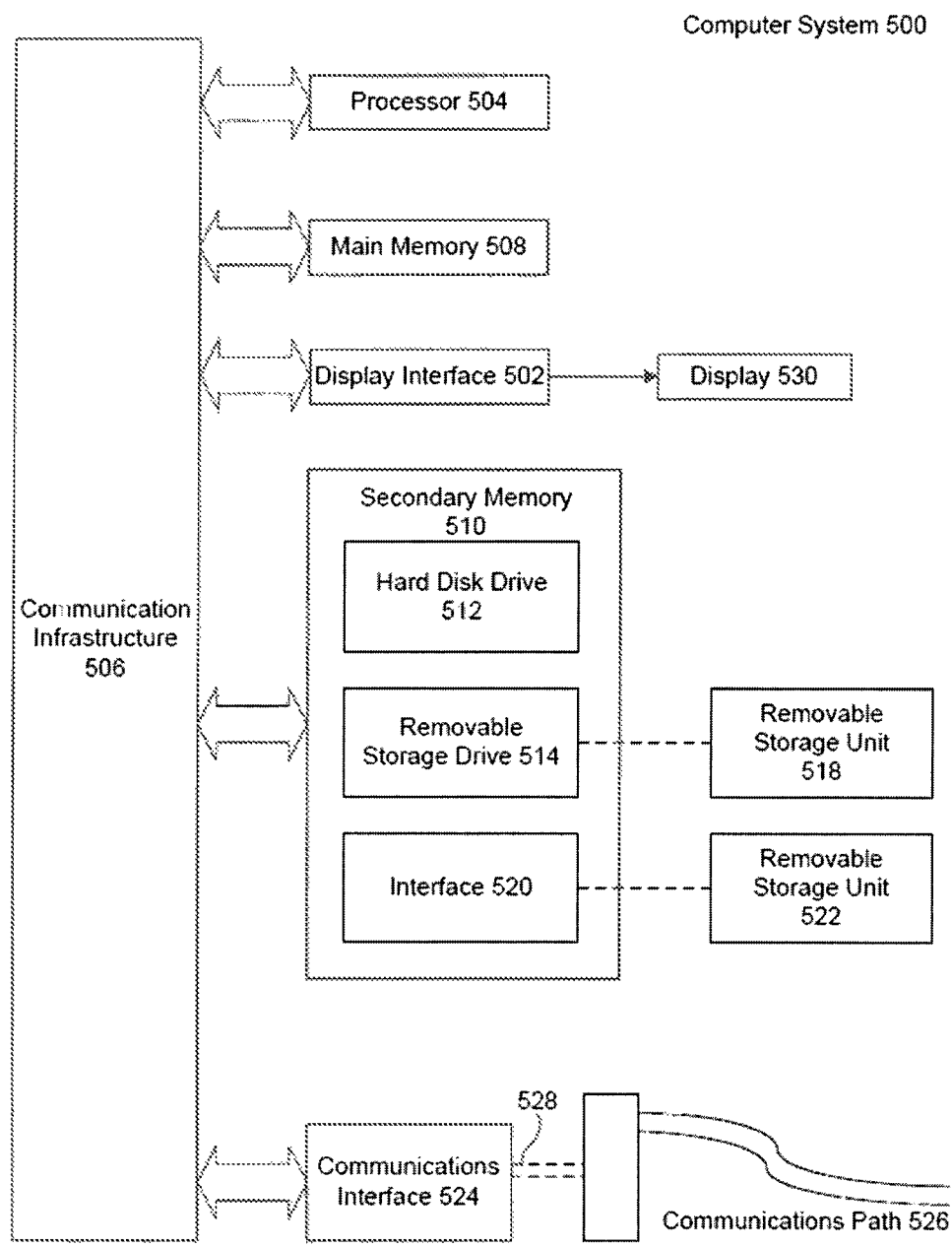
FIG. 5 is a block diagram of an exemplary computer system useful for implementing the present invention.

The present invention (i.e., components of deposit sweep arrangement 100 (e.g., back office service provider 102, deposit sweep engine 104 and its associated database and processor, settlement agent 106), process 200, process 300, process 400 or any parts or functions thereof) may be implemented using hardware, software or a combination thereof and may be implemented in one or more computer systems or other processing systems. However, the manipulations performed by the present invention are often referred to herein in terms, such as comparing or identifying, which are commonly associated with mental operations performed by a human operator. No such capability of a human operator is necessary, or desirable in most cases, in any of the operations described herein which form part of the present invention. Rather, the operations are machine operations. Useful machines for performing the operation of the present invention include general purpose digital computers or similar devices, such as a computer system 500, as shown in FIG. 5, in which the present invention, or portions thereof, can be implemented as computer-readable code.

Computer system 500 includes one or more processors, such as processor 504. Processor 504 can be a special purpose or a general purpose digital signal processor. Processor 504 is connected to a communications infrastructure 506 (for example, a bus or network). Various software implementations are described in terms of this exemplary computer system. After reading this description, it will become apparent to a person skilled in the relevant art how to implement the invention using other computer systems and/or computer architectures.

Computer system 500 can include a display interface 502 that forwards graphics, text, and other data from communication infrastructure 506 (or from a frame buffer not shown) for display on a display unit 530.

Computer system 500 also includes a main memory 508, preferably random access memory (RAM), and may also include a secondary memory 510. Secondary memory 510 may include, for example, a hard disk drive 512, a removable storage drive 514, and/or a memory stick or the like. Removable storage drive 514 may comprise a floppy disk drive, a magnetic tape drive, an optical disk drive, a flash memory, or the like. Removable storage drive 514 reads from and/or writes to a removable storage unit 518 in a well known manner. Removable storage unit 518 may comprise a floppy disk, magnetic tape, optical disk, etc. which is read by and written to by removable storage drive 514. As will be appreciated by persons skilled in the relevant art(s), removable storage unit 518 includes a computer usable storage medium having stored therein computer software and/or data.

In alternative implementations, secondary memory 510 may include other similar means for allowing computer programs or other instructions to be loaded into computer system 500. Such means may include, for example, a removable storage unit 522 and an interface 520. Examples of such means may include a program cartridge and cartridge interface, a removable memory chip (such as an erasable programmable read only memory (EPROM), programmable read only memory (PROM)) and associated socket, and other removable storage units 522 and interfaces 520 which allow software and data to be transferred from the removable storage unit 522 to computer system 500.

Computer system 500 may also include a communications interface 524. Communications interface 524 allows software and data to be transferred between computer system 500 and external devices. Communications interface 524 may include a modem, a network interface (such as an Ethernet card), a communications port, a Personal Computer Memory Card International Association (PCMCIA) slot and card, wired or wireless systems, or the like. Software and data transferred via communications interface 524 are in the form of signals 528 which may be electronic, electromagnetic, optical or other signals capable of being received by communications interface 524. These signals 528 are provided to communications interface 524 via a communications path 526. Communications path 526 carries signals 528 and may be implemented using wire or cable, fiber optics, a phone line, a cellular link, a radio frequency (RF) link and/or other communications channels.

In this document, the terms "computer program medium," "computer usable medium" and "computer readable medium" are used to generally refer to media such as removable storage unit 518, removable storage unit 522, and a hard disk installed in hard disk drive 512. Computer program medium and computer usable medium can also refer to memories, such as main memory 508 and secondary memory 510, which can be memory semiconductors (e.g., DRAMs, etc.). These computer program products are means for providing software to computer system 500.

Computer programs (also called computer control logic) are stored in main memory 508 and/or secondary memory 510. Computer programs may also be received via communications interface 524. Such computer programs, when executed, enable the computer system 500 to implement the present invention as discussed herein. In particular, the computer programs, when executed, enable the processor 504 to implement the processes of the present invention, such as the steps illustrated in FIGS. 2-4, discussed above. Accordingly, such computer programs represent controllers of the computer system 500. Where the invention is implemented using software, the software may be stored in a computer program product and loaded into computer system 500 using removable storage drive 514, interface 520, hard drive 512 or communications interface 524. The control logic (software), when executed by processor 504, causes processor 504 to perform the functions of the invention as described herein.

In another embodiment, the invention may be implemented primarily in hardware using, for example, hardware components such as an integrated circuit (IC) customized for a particular use, also known as application specific integrated circuits (ASICs). Implementation of the hardware state machine so as to perform the functions described herein will be apparent to persons skilled in the relevant art.

In yet another embodiment, the invention is implemented using a combination of both hardware and software.

The invention is also directed to computer program products comprising software stored on any computer useable medium. Such software, when executed in one or more data processing devices, causes the data processing device(s) to operate as described herein. Embodiments of the invention employ any computer useable or readable medium, known now or in the future. Examples of computer useable mediums include, but are not limited to, primary storage devices (e.g., any type of random access memory), secondary storage devices (e.g., hard drives, floppy disks, CD ROMS, DVD ROMS, ZIP disks, tapes, magnetic storage devices, optical storage devices, MEMS, nanotechnological storage device, etc.), and communication mediums (e.g., wired and wireless communications networks, local area networks, wide area networks, intranets, etc.). It is to be appreciated that the embodiments described herein can be implemented using software, hardware, firmware, or combinations thereof.

While various embodiments of the present invention have been described above, it should be understood that they have been presented by way of example, and not limitation. It will be apparent to persons skilled in the relevant art(s) that various changes in form and detail can be made therein without departing from the spirit and scope of the present invention. Thus, the present invention should not be limited by any of the above described exemplary embodiments, but should be defined only in accordance with the following claims and their equivalents.

In addition, it should be understood that the figures and screen shots illustrated in the attachments, which highlight the functionality and advantages of the present invention, are presented for example purposes only. The architecture of the present invention is sufficiently flexible and configurable, such that it may be utilized (and navigated) in ways other than that shown in the accompanying figures.

Further, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present invention in any way.

Example

FIGS. 6A-6H provide a table of data representative of data produced by an exemplary deposit sweep engine processor managing custodial deposit accounts according to one embodiment of the present invention. FIG. 6 provides account balance information for an Omnibus TA and Omnibus MMDA and corresponding Individual TAs and Individual MMDAs for the first eight days in a given month for three customers: Andrew, Betty, and Carl.

The first day of data is shown in FIG. 6A. Line 1 shows the respective account balances at the start of the first day. According to one embodiment of the present invention, the TTP is set to 5% and, as such, 5% of the total funds deposited by each customer is allocated to the customer's Individual TA and the remaining 95% of the total funds is allocated to the customer's Individual MMDA. This allocation provides a cushion for the Omnibus TA of 5%.

Lines 1a and 1b show the response of the deposit sweep engine processor to individual daily net account activity for day 1. Specifically, Andrew writes a check for $10, Betty deposits a check for $5, and Carl has no account activity. Line 1a shows the updated account balances following two allocations performed by the processor: (1) an allocation of funds from Andrew's MMDA to his TA to cover his check; and (2) an allocation of funds to Betty's TA to reflect her deposit. Line 1b shows the updated account balances following a $10 withdrawal from Andrew's TA to cover his check.

Based on the individual daily net activity, the processor determines that the daily net activity will result in a negative net balance change in the Omnibus MMDA of $5, caused by the transfer of funds from Andrew's MMDA to his TA to cover his $10 withdrawal. Line 1c shows the updated account balances following the processor's reallocation of funds in the Individual TAs and MMDAs to offset the negative net balance change. Specifically, the processor allocates funds first from an individual having the highest Individual TA balance to his or her corresponding Individual MMDA in order to offset the negative net balance change. This results in a $5 allocation from Betty's TA to her MMDA. This allocation reduces the cushion for the Omnibus TA to 3.39%.

At the end of the first day, although there was a negative net balance change of $5 resulting from the daily activity, the reallocation of funds in the Individual TAs and MMDAs has eliminated the net transfer from the Omnibus MMDA. The only individual charged with an MMDA transfer (as reflected by the incremented individual transfer counter) is Andrew because he is the only individual having an MMDA transfer from his account.

The second day of data is shown in FIG. 6B. Line 2 shows the updated account balances following the daily settlement of accounts during day 1. Lines 2a and 2b show the response of the deposit sweep engine processor to individual daily net account activity for day 2. Specifically, Andrew writes a check for $5 and both Betty and Carl have no account activity. Line 2a shows the updated account balances following an allocation of funds from Andrew's MMDA to his TA to cover his check. Line 2b shows the updated individual account balances following a $5 withdrawal from Andrew's TA to cover his check.

Based on the individual daily net activity, the processor determines that the daily net activity will result in a negative net balance change in the Omnibus MMDA of $5, caused by the transfer of funds from Andrew's MMDA to his TA to cover his $5 withdrawal. Line 2c shows the updated individual account balances following the processor's reallocation of funds in the Individual TAs and MMDAs to offset the negative net balance change. Specifically, the processor allocates funds from Betty's TA to Betty's MMDA because Betty has the highest TA balance among the three individuals. This results in a $5 allocation from Betty's TA to her MMDA. Note that because Carl has an equally high TA balance, the processor could have transferred the $5 from Carl's TA to Carl's MMDA instead. However, regardless of whose account is used, the allocation reduces the cushion for the Omnibus TA to 1.72%.

At the end of the second day, although there was a negative net balance change of $5 resulting from the daily activity, the reallocation of funds in the Individual TAs and Individual MMDAs has eliminated the negative net balance change from the Omnibus MMDA. The only individual charged with an MMDA transfer is Andrew because he is the only individual having an MMDA transfer from his account.

The third day of data is shown in FIG. 6C. Line 3 shows the updated account balance following the daily settlement of accounts during day 2. Line 3a shows the response of the deposit sweep engine processor to individual daily net account activity for day 3. Specifically, Betty deposits $20 and both Andrew and Carl have no account activity. Line 3a shows the updated account balances following an allocation of funds to Betty's TA to reflect her deposit.

Based on the individual daily net activity, the processor determines that the daily net activity will not result in negative net balance change from the Omnibus MMDA. The processor determines that the daily net activity increases the Omnibus TA balance above the target Omnibus TA balance. That is, Betty's deposit increases the cushion for the Omnibus TA to 8.86%, which is above the TTP of 5%. Line 3b shows the updated account balances following a reallocation by the processor to reduce the cushion to the TTP of 5%. Specifically, $9.50 of Betty's $20.00 deposit is allocated to her MMDA, the rest being allocated to her TA.

The fourth day of data is shown in FIG. 6D. Line 4 shows the updated account balance following the daily settlement of accounts during day 3. Lines 4a and 4b show the response of the deposit sweep engine processor to individual daily net account activity for day 4. Specifically, Carl writes a check for $20 and both Andrew and Betty have no account activity. Line 4a shows the updated account balances following an allocation of funds from Carl's MMDA to his TA to cover his check. Line 4b shows the updated account balances following a $20 withdrawal from Carl's TA to cover his check.

Based on the individual daily net activity, the processor determines that the daily net activity will result in a negative net balance change in the Omnibus MMDA of $15, caused by the transfer of funds from Carl's MMDA to his TA to cover his $20 withdrawal. Unlike the situation in days 1 and 2, however, the negative net balance change is greater than the balance of the Omnibus TA. As a result, the custodial accounts are charged with an Omnibus MMDA transfer (as reflected by the incremented Custodial transfer counter) and the TTP is increased. Here the TTP is increased by 7% for a resulting TTP of 12%. The processor determines that the total amount of funds needed to be transferred from the various Individual MMDAs to their respective TAs to provide for a 12% TTP is equal to $24.30. Because Carl's Individual MMDA transfer counter will be incremented anyway and because he has enough funds to cover the transfer, the processor allocates the $24.30 from Carl's MMDA to his TA. Line 4c shows the account balances following this allocation. If, however, Carl did not have enough funds to cover the transfer, the processor would allocate funds first from an individual having the highest TA balance. In another embodiment, the processor would rank potential individuals based on their Individual transfer counter and TA balance in order to minimize the number of individuals charged with an MMDA withdrawal while favoring individuals having lower Individual transfer counters.

The fifth day of data is shown in FIG. 6E. Line 5 shows the respective account balances following the daily settlement of accounts during day 4. Lines 5a and 5b show the response of the deposit sweep engine processor to individual daily net account activity for day 5. Specifically, Andrew writes a check for $10 and both Betty and Carl have no account activity. Line 5a shows the updated account balances following an allocation of funds from Andrew's MMDA to his TA to cover his check. Line 5b shows the updated account balances following a $10 withdrawal from Andrew's TA to cover his check.

Based on the individual daily net activity, the processor determines that the daily net activity will result in a negative net balance change in the Omnibus MMDA of $10, caused by the transfer of funds from Andrew's MMDA to his TA to cover his $10 withdrawal. Line 5c shows the updated account balances following the processor's reallocation of funds in the Individual TAs and MMDAs to offset the negative net balance change. Specifically, the processor allocates funds from Carl's TA to Carl's MMDA because Carl has the highest TA balance among the three individuals. This results in a $10 allocation from Carl's TA to his MMDA. This allocation reduces the cushion for the Omnibus TA to 8.86%

At the end of the fifth day, although there was a negative net balance change of $10 resulting from the daily activity, the reallocation of funds in the Individual TAs and MMDAs has eliminated the net transfer from the Omnibus MMDA. The only individual charged with an MMDA transfer is Andrew because he is the only individual having an MMDA transfer from his account.

The sixth day of data is shown in FIG. 6F. Line 6 shows the updated account balances following the daily settlement of accounts during day 5. Lines 6a and 6b show the response of the deposit sweep engine processor to individual daily net account activity for day 6. Specifically, Andrew writes a check for $45 and both Betty and Carl have no account activity. Line 6a shows the updated account balances following an allocation of funds from Andrew's MMDA to his TA to cover his check. Line 6b shows the updated account balances following a $45 withdrawal from Andrew's TA to cover his check.

Based on the individual daily net activity, the processor determines that the daily net activity will result in a negative net balance change in Omnibus MMDA of $45, caused by the transfer of funds from Andrew's MMDA to his TA to cover his $45 withdrawal. Like the situation in day 4, the negative net balance change is greater than the balance of the Omnibus TA. As a result, the custodial accounts are charged with an Omnibus MMDA transfer and the TTP is increased. Here the TTP is increased by 15% for a resulting TTP of 27%. The processor determines the total amount of funds needed to be transferred from the various Individual MMDAs to their respective TAs to provide for a 27% TTP is equal to $38.65. Because Andrew does not have enough funds to cover the transfer, the processor allocates funds first from an individual having the highest MMDA balance. As a result, Betty's MMDA counter is incremented and the $38.65 is moved from her MMDA to her TA. Line 6c shows the account balances following this allocation.

The seventh day of data is shown in FIG. 6G. Line 7 shows the updated account balances following the daily settlement of accounts during day 6. Line 7a shows the response of the deposit sweep engine processor to individual daily net account activity for day 6. Specifically, Andrew deposits $100 and both Andrew and Carl have no account activity. Line 7a shows the updated account balances following an allocation of funds to Andrew's TA to reflect his deposit.

Based on the individual daily net activity, the processor determines that the daily net activity will not result in a negative net balance change in the Omnibus MMDA. The processor determines that the daily net activity increases the Omnibus TA balance above the target Omnibus TA balance. That is, Andrew's deposit increases the cushion for the Omnibus TA to 48.79%, which is above the TTP of 27%. Line 7b shows the updated account balances following a reallocation by the processor to reduce the cushion to the TTP of 27%. Specifically, $63.00 of Andrew's $100.00 deposit is allocated to his MMDA, the rest being allocated to his TA.

The eighth day of data is shown in FIG. 6H. Line 8 shows the updated account balances following the daily settlement of accounts during day 7. Lines 8a and 8b show the response of the deposit sweep engine processor to individual daily net account activity for day 8. Specifically, Andrew writes a check for $110, Carl deposits $5, and Betty has no account activity. Line 8a shows the updated account balances following two allocations performed by the processor: (1) an allocation of funds from Andrew's MMDA to his TA to cover his check; and (2) an allocation of funds to Carl's TA to reflect his deposit. Line 8b shows the updated account balances following a $110 withdrawal from Andrew's TA to cover his check.

Based on the individual daily net activity, the processor determines that the daily net activity will result in a negative net balance change in the Omnibus MMDA of $105, caused by the transfer of funds from Andrew's MMDA to his TA to cover his $110 withdrawal. Like the situations in days 4 and 6, the negative net balance change is greater than the balance of the Omnibus TA. As a result, the custodial accounts are charged with an Omnibus MMDA transfer and the TTP is increased. Here the TTP is increased by 20% for a resulting TTP of 47%. The processor determines that the total amount of funds needed to be transferred from the various Individual MMDAs to their respective TAs to provide for a 47% TTP is equal to $39.65. Because Andrew does not have enough funds to cover the transfer, the processor allocates funds first from an individual having the highest MMDA balance. As a result, Betty's MMDA transfer counter is incremented and the $39.65 is moved from her MMDA to her TA. Line 8c shows the account balances following this allocation.

As would be apparent to one of ordinary skill in the art, the deposit sweep engine processor will continue to manage the custodial deposit accounts, as discussed above, for the remainder of the month or statement cycle, and then rebalance the individual accounts of Andrew, Betty and Carl at the beginning of the following month or statement cycle.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A computer-implemented method for managing, over a period of time, aggregate funds held in custodial accounts at a depository institution by a custodial agent on behalf of a plurality of individuals, wherein said custodial accounts comprise an omnibus transaction account ("Omnibus TA") and an omnibus money market deposit account ("Omnibus MMDA"), comprising:
   (a) establishing an individual transaction account ("Individual TA") data set in a memory of said computer for each of said plurality of individuals, comprising Individual TA data representative of the amount of said individual's funds allocated to said Omnibus TA;
   (b) establishing an individual money market deposit account ("Individual MMDA") data set in a memory of said computer for each of said plurality of individuals, comprising Individual MMDA data representative of the amount of said individual's funds allocated to said Omnibus MMDA;
   (c) establishing an Omnibus TA data set in a memory of said computer comprising Omnibus TA data representative of the amount of said aggregate funds allocated to said Omnibus TA;
   (d) establishing an Omnibus MMDA data set in a memory of said computer comprising Omnibus MMDA data representative of the amount of said aggregate funds allocated to said Omnibus MMDA;
   (e) receiving individual transaction data representative of individual withdrawals to and/or deposits from said custodial accounts by one or more of said plurality of individuals over an interval of said period of time;
   (f) modifying said Individual TA data and said Individual MMDA data for one or more of said plurality of individuals to reflect a net change to the amount of the individual's funds allocated to said Omnibus TA and said Omnibus MMDA, respectively, based on said received individual transaction data, and storing said modified Individual TA data in said Individual TA data set and said modified Individual MMDA data in said Individual MMDA data set;
   (g) after step (f), comparing said Individual MMDA data and said Omnibus MMDA data and calculating a net adjustment to be made to the amount of funds in said Omnibus MMDA, and storing said net adjustment in a memory of said computer;

(h) comparing said net adjustment to said Omnibus MMDA data and, if said net adjustment is a negative net balance change in an amount not greater than the amount of funds in said Omnibus TA, further modifying said Individual TA data and said Individual MMDA data for one or more of said plurality of individuals to offset said net adjustment, and storing said further modified Individual TA data in said Individual TA data set and said further modified Individual MMDA data in said Individual MMDA data set; and (i) modifying said Omnibus TA data based on the Individual TA data stored in said Individual TA data set and modifying said Omnibus MMDA data based on the Individual MMDA data stored in said Individual MMDA data set.

2. The method according w claim 1, further comprising:
establishing an Omnibus MMDA transfer counter data set in a memory of said computer comprising Omnibus MMDA transfer counter data representative of the number of transfers from said Omnibus MMDA during said period of time; and
wherein said step (h) further comprises, comparing said net adjustment to said Omnibus TA data and, if said net adjustment is a negative net balance change in an amount greater than the amount of funds in said Omnibus TA, incrementing said Omnibus MMDA transfer counter data by one.

3. The method according to claim 2, wherein if said Omnibus MMDA transfer counter data is equal to a transfer limit for said Omnibus MMDA, said step (h) further comprises, further modifying said Individual TA data and said Individual MMDA data for each of said individuals, such that the entire amount of funds allocated to each individual's MMDA is reallocated to said individual's TA, and storing said further modified Individual TA data in said Individual TA data set, and storing said further modified Individual MMDA data in said Individual MMDA data set.

4. The method according to claim 3, wherein said transfer limit is six.

5. The method according to claim 2, further comprising:
at the beginning of said period of time, setting said Omnibus MMDA transfer counter data to zero.

6. The method according to claim 1, further comprising:
at the beginning of said period of time, modifying said Omnibus TA data and said Omnibus MMDA data such that a percent greater than 0% of said aggregate funds is allocated to said Omnibus TA.

7. The method according to claim 6, wherein said percent of said aggregate funds allocated to said Omnibus TA is not greater than about 5%.

8. The method according to claim 1, further comprising, prior to step (g):
receiving Omnibus TA data representative of the current balance of funds in said Omnibus TA, and storing said Omnibus TA data in said Omnibus TA data set; and
receiving Omnibus MMDA data representative of the current balance of funds in said Omnibus MMDA, and storing said Omnibus MMDA data in said Omnibus MMDA data set.

9. The method according to claim 1, further comprising, after step (i):
deriving aggregate custodial accounts transaction data, representative of a net aggregate withdrawal from or net aggregate deposit to said custodial accounts, for said interval of said period of time, from said individual transaction data and Omnibus TA data and said Omnibus MMDA data.

10. The method according to claim 9, further comprising:
transmitting said derived aggregate custodial accounts transaction data to said depository institution.

11. The method according to claim 1, further comprising, after step (i):
transmitting said Omnibus TA data and said Omnibus MMDA data to said depository institution.

12. The method according to claim 1, further comprising, after step (i):
transmitting said Individual TA data and said Individual MMDA data to said custodial agent.

13. The method according to claim 1, wherein said period of time is a month.

14. The method according to claim 1, wherein said interval of said period of time is a day.

15. The method according to claim 1, wherein said individual transaction data comprises a net individual withdrawal from or net individual deposit to said custodial accounts.

16. A computer-implemented method for managing funds deposited in the aggregate in custodial accounts at a depository institution by a custodial agent on behalf of a plurality of individuals, wherein said custodial accounts comprise an omnibus transaction account ("Omnibus TA") and an omnibus money market deposit account ("Omnibus MMDA") and each individual's contribution to said custodial accounts is represented by an individual transaction account ("Individual TA") and individual money market deposit account ("Individual MMDA"), such that said Omnibus TA has a balance equal to the sum of the Individual TAs and said Omnibus MMDA has a balance equal to the sum of the Individual MMDAs, comprising:

(a) determining with one or more processors a net balance change for said Omnibus MMDA from daily transaction data for one or more of said plurality of individuals;

(b) comparing with said one or more processors said net balance change to the balance of funds in said Omnibus TA; and (c) if said net balance change is not greater than the balance of funds in said Omnibus TA, then transferring funds from one or more Individual TAs to their respective Individual MMDAs to offset said net balance change.

17. The method according to claim 16, further comprising:
if said net balance change is greater than the balance of funds in said Omnibus TA, then transferring an amount of funds equal to said net balance change amount from one or more Individual MMDAs to their respective Individual TAs.

18. The method according to claim 16, further comprising:
if the net balance change is greater than the balance of funds in said Omnibus TA, then transferring an amount of funds greater than said net balance change amount from one or more Individual MMDAs to their respective Individual TAs.

19. A computer-implemented method for managing funds deposited in the aggregate in custodial accounts at a depository institution by a custodial agent on behalf of a plurality of individuals, wherein said custodial accounts comprise an omnibus transaction account ("Omnibus TA") and an omnibus money market deposit account ("Omnibus MMDA") and each individual's contribution to said custodial accounts is represented by an individual transaction account ("Individual TA") and an individual money market deposit account ("Individual MMDA"), such that said Omnibus TA has a balance equal to the sum of the Individual TAs and said Omnibus MMDA has a balance equal to the sum of the Individual MMDAs, comprising:

(a) at the beginning of a month or statement period, allocating with one or more processors a percent of said deposited funds greater than 0% to said Omnibus TA; and (b) increasing with said one or more processors the percent of said deposited funds allocated to said Omnibus TA upon a transfer from said Omnibus MMDA during said month, by transferring an amount of funds greater than the amount of said transfer from one or more Individual MMDAs to their respective Individual TAs.

20. The method according to claim 19, further comprising:

determining with one or more processors a remaining number of transfers from the Omnibus MMDA for said month or statement period as dictated by an established transfer limit;

decreasing with said one or more processors the percent of said deposited funds allocated to said Omnibus TA to 0%, by transferring the funds in all Individual TAs to their respective Individual MMDAs, if said remaining number of transfers is an amount greater than the number of days remaining in the month.

* * * * *

UNITED STATES PATENT AND TRADEMARK OFFICE
CERTIFICATE OF CORRECTION

| | | |
|---|---|---|
| PATENT NO. | : 8,712,881 B1 | Page 1 of 1 |
| APPLICATION NO. | : 13/560544 | |
| DATED | : April 29, 2014 | |
| INVENTOR(S) | : Phillips et al. | |

It is certified that error appears in the above-identified patent and that said Letters Patent is hereby corrected as shown below:

In the Claims

At Column 20, line 42, please replace "establishing an Omnibus'TA" with --establishing an Omnibus TA--.

At Column 21, line 16, please replace "according w claim 1" with --according to claim 1--.

Signed and Sealed this
Sixteenth Day of September, 2014

Michelle K. Lee
*Deputy Director of the United States Patent and Trademark Office*